United States Patent
Ito

(10) Patent No.: US 11,055,046 B2
(45) Date of Patent: Jul. 6, 2021

(54) IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventor: Chie Ito, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/507,569

(22) Filed: Jul. 10, 2019

(65) Prior Publication Data

US 2020/0034089 A1 Jan. 30, 2020

(30) Foreign Application Priority Data

Jul. 25, 2018 (JP) .............................. JP2018-139624

(51) Int. Cl.
*G06F 15/00* (2006.01)
*G06F 3/12* (2006.01)

(52) U.S. Cl.
CPC ............ *G06F 3/128* (2013.01); *G06F 3/1256* (2013.01); *G06F 3/1285* (2013.01); *G06F 3/1293* (2013.01)

(58) Field of Classification Search
CPC ...... G06F 3/128; G06F 3/1256; G06F 3/1285; G06F 3/1293
USPC ....................................................... 358/1.15
See application file for complete search history.

(56) References Cited

U.S. PATENT DOCUMENTS

| 7,584,242 | B2 * | 9/2009 | Ebuchi ................. G06F 3/1256 345/561 |
| 9,348,545 | B2 | 5/2016 | Sasaki |
| 2004/0080778 | A1 * | 4/2004 | Ito ...................... H04N 1/00204 358/1.14 |
| 2015/0212781 | A1 | 7/2015 | Sasaki |
| 2017/0060719 | A1 | 3/2017 | Ito |

FOREIGN PATENT DOCUMENTS

JP 2015157473 A 9/2015

* cited by examiner

*Primary Examiner* — Mark R Milia
(74) *Attorney, Agent, or Firm* — Venable LLP

(57) ABSTRACT

The image forming apparatus comprises a determination unit configured to determine whether or not corresponding image data is cached in accordance with an instruction for generation of image data for the file stored in the memory, and an image processing unit configured to generate image data for the file in a case that the determination unit determines that the corresponding image data is not cached. The image forming apparatus controls to skip generation of image data by the image processing unit in a case that the instruction for generation of image data for the file is an instruction for an anticipation cache of image data for the file, and a file type of the file is a second type requiring, for generation of image data, a longer amount of time than a first type.

18 Claims, 20 Drawing Sheets

IMAGE FORMING APPARATUS, METHOD OF CONTROLLING THE SAME, AND STORAGE MEDIUM

BACKGROUND OF THE INVENTION

Field of the Invention

The present invention relates to an image forming apparatus, a method of controlling the same, and a storage medium.

Description of the Related Art

An image forming apparatus having a function of accessing files stored in a removable medium such as a USB memory and inputting/outputting image data is known. There are an increasing number of devices that support a preview display in which, in a case of printing image data stored in a removable medium (hereinafter, referred to as media print), image data of a file can be confirmed so that a user can easily select a desired file. Among devices that support such a preview display, there are also devices that can save image data that has been subject to a preview display once as a cache file, and then read and display the cache file when performing a preview display of the same file. In addition, image data that might be displayed, for example display image data for a file that is saved in a USB memory and has not yet displayed even once, is generated in advance and held as a cache file (hereinafter, an anticipation cache), thereby enabling display of the image data to be quicker.

On the other hand, in an inexpensive image forming apparatus deficient in resources, processing for generating image data cannot be subject to multitasking control, and image data is generated in an order starting with targets for which there was an image data generation request. Therefore, for example, it is not possible to execute in parallel a process of generating image data for a file which is saved in a USB memory and for which a preview display is requested, and a process of generating image data for an anticipation cache. Therefore, if processing for generating image data for the anticipation cache takes time, the processing of generating the image data for a preview display is made to wait. In particular, a process of generating image data of a file subjected to complicated image processing such as transparency processing in a PDF (Portable Document Format) file may be very time-consuming. When during processing for an anticipation cache of a PDF file, which takes time to generate image data, the preview display of a file that has already been cached or a JPEG or TIFF file that takes less time for the generation of image data than a PDF is also made to wait. For example, Japanese Patent Laid-Open No. 2015-157473 describes a technique for reducing waiting time of a user at a time of a preview display and improving operability for the user.

In the above-mentioned prior art, before receiving a preview display instruction, target data is transmitted to an external processing device, thereby reducing the waiting time of the user. However, there is a problem that, in a resource-deficient image forming apparatus, communicating with an external device and executing image processing results in an increase in the waiting time of a user.

SUMMARY OF THE INVENTION

An aspect of the present invention is to eliminate the above-mentioned problem with conventional technology.

A feature of the present invention is to provide a technique by which it is possible to swiftly display a preview of a file stored in a memory, and improve a feeling of control.

According to a first aspect of the present invention, there is provided an image forming apparatus capable of a preview display of a file stored in a memory, comprising: a memory device that stores instructions; and at least one processor that executes the instructions stored in the memory device to cause the image forming apparatus to function as: a determination unit configured to determine whether or not corresponding image data is cached in accordance with an instruction for generation of image data for the file stored in the memory; an image processing unit configured to generate image data for the file in a case that the determination unit determines that the corresponding image data is not cached; and a control unit configured to perform control to skip generation of image data by the image processing unit in a case that the instruction for generation of image data for the file is an instruction for an anticipation cache of image data for the file, and a file type of the file is a second type requiring, for generation of image data, a longer amount of time than a first type.

According to a second aspect of the present invention, there is provided an image forming apparatus capable of a preview display of a file stored in a memory, comprising: a memory device that stores instructions; and at least one processor that executes the instructions stored in the memory device to cause the image forming apparatus to function as: a determination unit configured to determine whether or not corresponding image data is cached in accordance with an instruction for generation of image data for the file stored in the memory; an image processing unit configured to, in a case that the determination unit determines that the corresponding image data is cached, use the cached image data, and generate image data for the file in a case that the determination unit determines that the corresponding image data is not cached; and a control unit configured to perform control to, in a case that a preview display of the file stored in the memory is instructed when the image processing unit is generating the image data, interrupt generation of the image data by the image processing unit, and subsequently cause the image processing unit to start processing to generate image data for the preview display of the file.

According to a third aspect of the present invention, there is provided a method of controlling an image forming apparatus capable of a preview display of a file stored in a memory, the method comprising: determining whether or not corresponding image data is cached in accordance with an instruction for generation of image data for the file stored in the memory; generating image data for the file in a case that it is determined that the corresponding image data is not cached; and performing control to skip generation of image data in a case that the instruction for generation of image data for the file is an instruction for an anticipation cache of image data for the file, and a file type of the file is a second type requiring, for generation of image data, a longer amount of time than a first type.

According to a fourth aspect of the present invention, there is provided a method of controlling an image forming apparatus capable of preview display of a file stored in a memory, the method comprising: determining whether or not corresponding image data is cached in accordance with an instruction for generation of image data for the file stored in the memory; using the cached image data in a case that it is determined that the corresponding image data is cached, and generating image data for the file in a case that it is determined that the corresponding image data is not cached; and performing control to, in a case that a preview display of the file stored in the memory is instructed when the image data is being generated, interrupt generation of the image data, and subsequently start processing to generate image data for the preview display of the file.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1A:
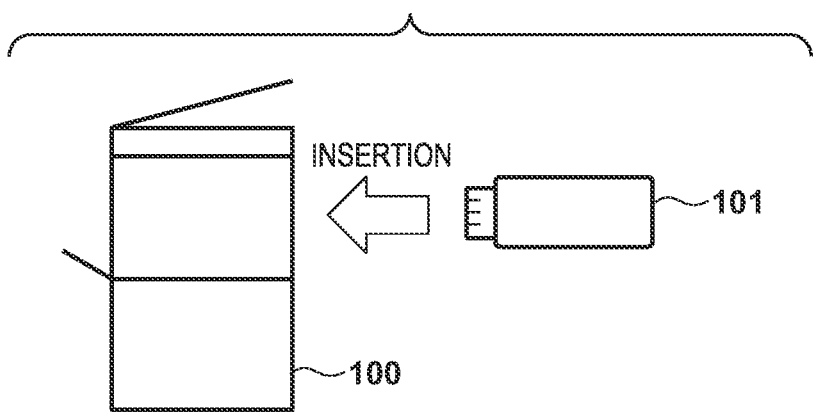
FIG. 1A is a schematic diagram of an image forming apparatus according to an embodiment.

FIG. 1A is a schematic diagram of an image forming apparatus (multi-function peripheral (MFP)) 100 according to an embodiment.

The image forming apparatus 100 can be mounted with a USB memory 101, which is a removable medium. When the USB memory 101 is loaded, a file stored in the USB memory 101 can be accessed to input image data of the file or to write a file from the image forming apparatus 100 to the USB memory 101. One or more files of image data that can be subject to a preview display have been saved in the USB memory 101.

Figure 1B:
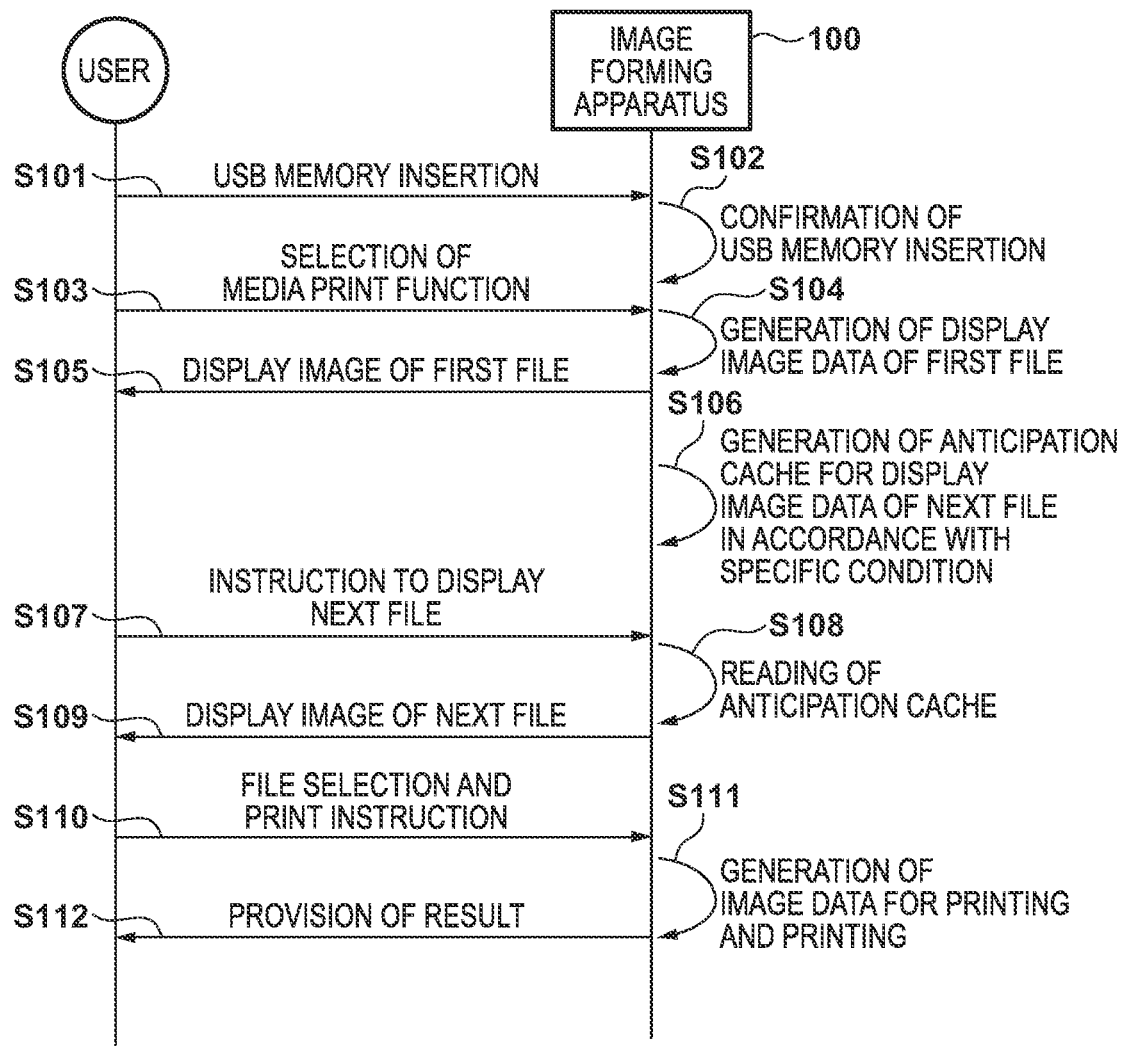
FIG. 1B depicts a view for describing an example of a typical sequence from when a user inserts a USB memory into a connector of the image forming apparatus until an image file stored in the USB memory is printed.

FIG. 1B depicts a view for describing an example of a typical sequence from when a user inserts the USB memory 101 into a connector of the image forming apparatus 100 to when an image file stored in the USB memory 101 is printed.

In step S101, the user inserts the USB memory into the image forming apparatus 100. By this, in step S102, the image forming apparatus 100 confirms that the USB memory has been inserted. Next, in step S103, the user presses a media print button on a LUI (local user interface) of the image forming apparatus 100, which will be described later. As a result, in step S104, the image forming apparatus 100 generates a display image of a first file of the USB memory 101 and, in step S105, displays it on the LUI. Then, while there is no user operation, that is, in step S106 which is a free time period, a cache file of an image which has not yet been displayed and is subsequent to the first file of the USB memory 101 is generated in accordance with a condition which is described later. In step S107, if there is, in accordance with a user operation, a request to display the next file, for example, the image data generated by the anticipation cache in step S106 is read in step S108 and displayed on the LUI in step S109. In step S110, the user confirms the content of each file in accordance with the preview display, selects a desired file, and executes printing of the selected file. Thus, in step S111, the image forming apparatus 100 generates image data for printing, executes printing, and, in step S112, provides the printed matter to the user.

Figure 2:
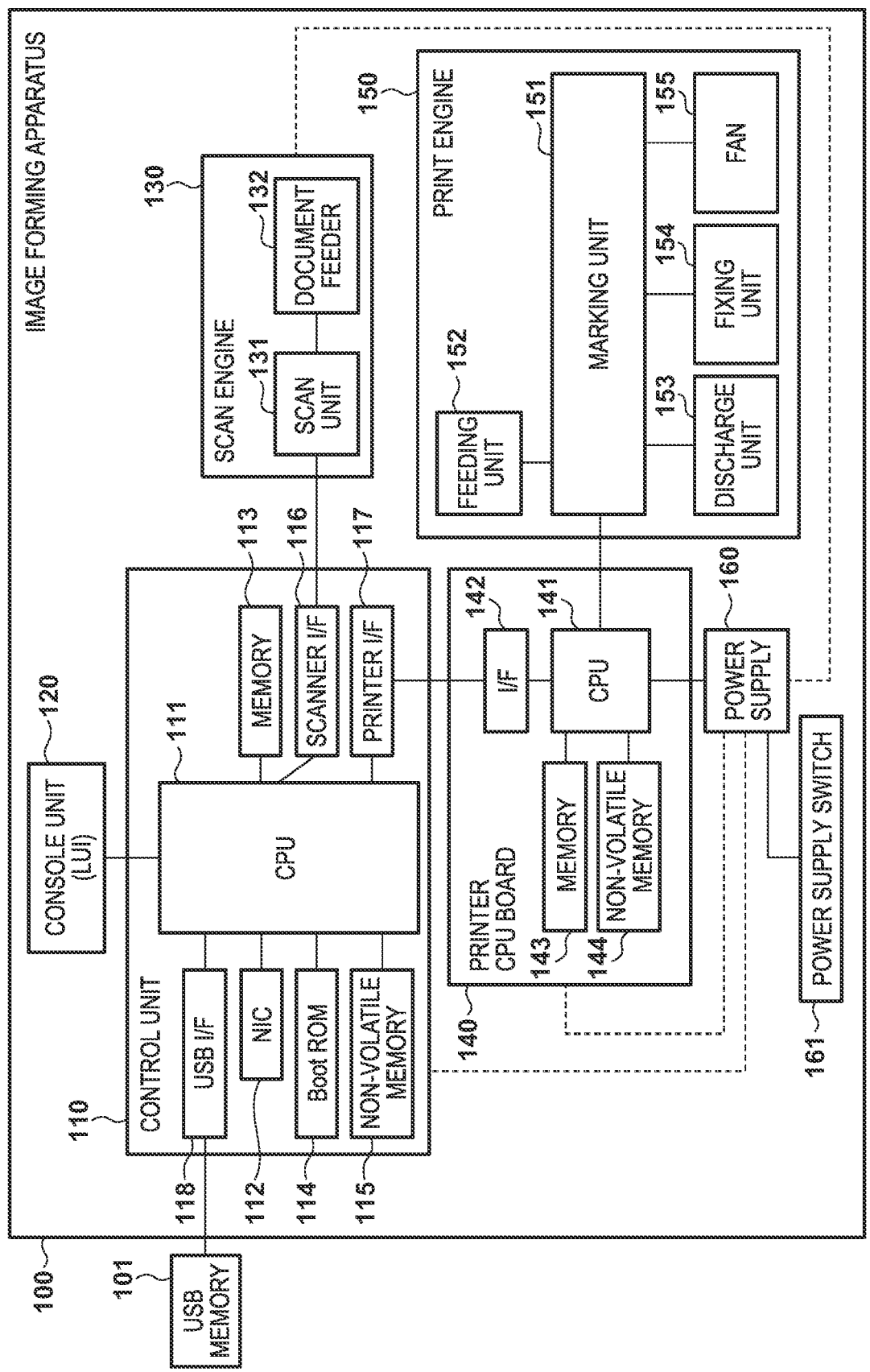
FIG. 2 is a block diagram for describing a hardware configuration of the image forming apparatus according to the embodiment.

FIG. 2 is a block diagram for describing a hardware configuration of the image forming apparatus 100 according to the embodiment.

The image forming apparatus 100 is a so-called multi-function printer (MFP) that includes a scan engine 130 and a print engine 150. In addition, the image forming apparatus 100 includes a control unit 110 that includes a CPU board, a console unit 120, a printer CPU board 140, a power supply 160, and a power supply switch 161. The scan engine 130 includes a scan unit 131 for optically scanning a document and converting it to digital image data, and a document feeder 132 that can automatically and sequentially exchange document bundles to feed each document. The scan engine 130 transmits converted image data to the control unit 110. The print engine 150 includes a marking unit 151 for printing image data onto a fed sheet, a feeding unit 152 that can sequentially feed sheets one by one from a sheet bundle, and a discharge unit 153 for discharging a printed sheet. The print engine 150 further includes a fixing unit 154 for fixing, by heat and pressure, toner printed by the marking unit 151, and a fan 155 for cooling.

The console unit 120 provides a local user interface (LUI) for operating the image forming apparatus 100. The control unit 110 is connected to these components, and executes jobs on the image forming apparatus 100. The control unit 110 is a general-purpose CPU system, and includes a CPU 111 for controlling the entire CPU board, a memory 113 used by the CPU 111 as a work memory, and a Boot ROM 114 that includes a boot program. Further, the control unit 110 includes a NIC 112 for making a network connection to an external unit, a USB I/F 118 for controlling input/output to/from the USB memory 101, and a non-volatile memory 115 that includes firmware. The non-volatile memory 115 may be mounted on the CPU board or may be connected to the CPU board. A scanner I/F 116 and a printer I/F 117 are respectively connected to the scan engine 130 and the printer CPU board 140.

The printer CPU board 140 includes a CPU 141 for controlling the entire board, a memory 143 used by the CPU 141 as a work memory, and a non-volatile memory 144 for storing, for example, programs to be executed by the CPU 141. The printer CPU board 140 further includes an I/F 142 to interface with the printer I/F 117.

Dashed lines in FIG. 2 indicate power supply lines. The power supply 160 supplies power to the control unit 110, the scan engine 130, the printer CPU board 140, and the print engine 150. The power supply switch 161 is a hardware switch for controlling ON/OFF of the supply of power. When the power supply switch 161 is turned on, content of the Boot ROM 114 is read out of the memory 113 and executed sequentially by the CPU 111 to set various hardware and activate the OS. When the processing based on content of the Boot ROM 114 is completed, the CPU 111 operates in accordance with the program (firmware) stored in the non-volatile memory 115, so that jobs can be accepted and executed.

Figure 3:
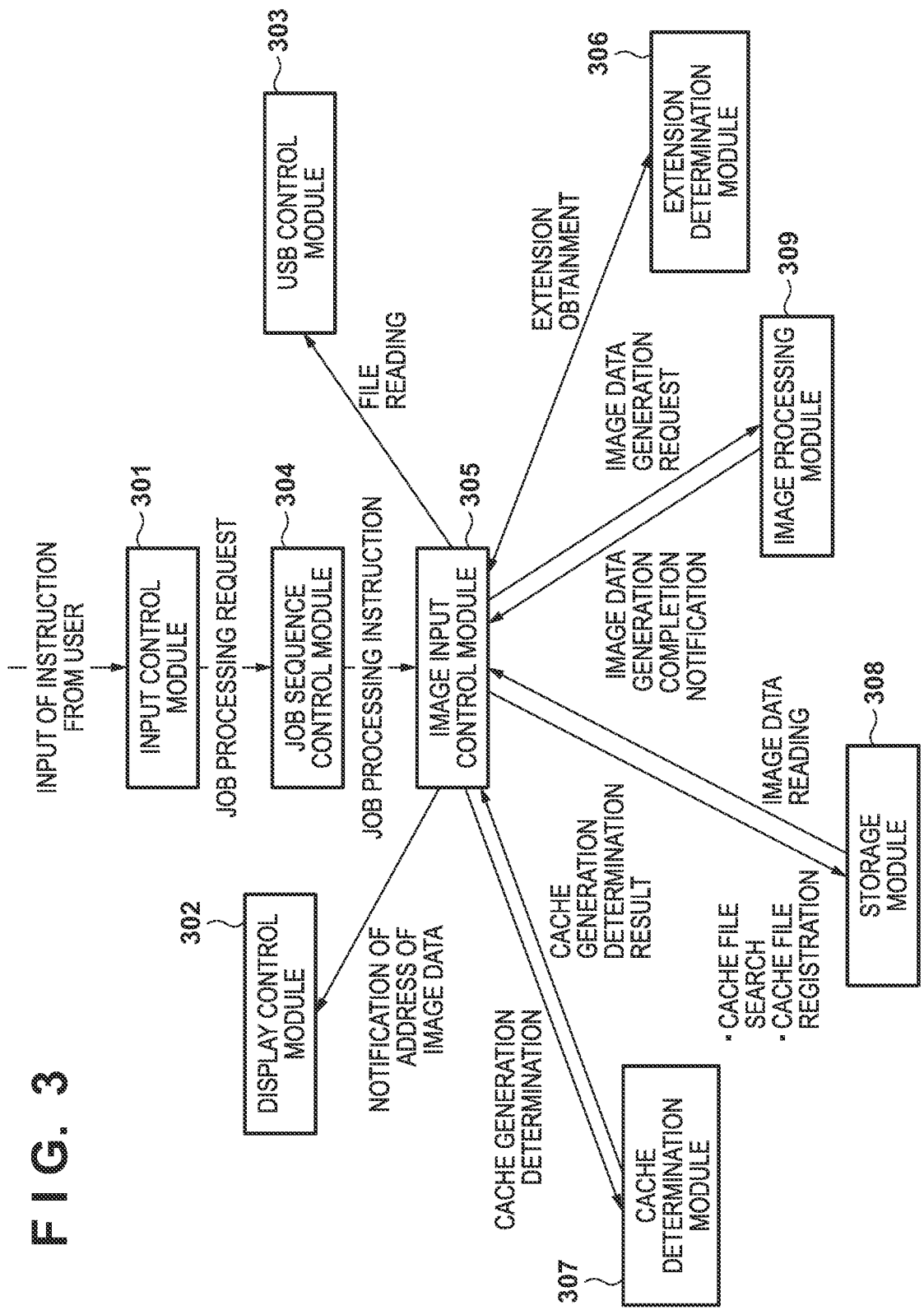
FIG. 3 is a functional block diagram for describing a software module configuration of the image forming apparatus according to the embodiment.

FIG. 3 is a functional block diagram for describing a software module configuration of the image forming apparatus 100 according to the embodiment. The respective functional modules shown in FIG. 3 are realized by the CPU 111 of the control unit 110 of the image forming apparatus 100 executing the above-described program.

An input control module 301 waits for an instruction from a user via the console unit 120, and notifies other functional modules of detail of the accepted instruction. A display control module 302 displays an operation menu and instruction results on the console unit 120 in accordance with instructions from other functional modules. A USB control module 303 controls the USB OF 118, and inputs and outputs information between the image forming apparatus 100 and the USB memory 101 in accordance with instructions from other functional modules. A job sequence control module 304 creates a job based on a notification from the input control module 301 or the USB control module 303, processes the job, and issues instructions to other functional modules at appropriate timings to process inputted jobs in a predetermined order. When the power supply of the image forming apparatus 100 is turned on, the job sequence control module 304 outputs instructions to the other functional modules to perform activation processing.

Upon receiving a job start instruction from the job sequence control module 304, an image input control module 305 sets parameters required for an image processing module 309 to perform image processing and instructs the start of image processing. In a case of a media print, image data of the USB memory 101 is read via the USB control module 303, and the image processing module 309 is requested to process the read image data. The image processing module 309 performs image processing such as a calibration and a color conversion on image data such as JPEG or page data interpreted by a functional module (not shown) that performs PDL processing. An extension determination module 306 obtains the extension of the image data to be processed of the job for which the image input control module 305 has received the start instruction, and determines the file type of the target image data. A cache determination module 307 determines whether the generation of the image data performed in accordance with the job for which the image input control module 305 has received the start instruction is something in accordance with a preview display or for an anticipation cache. A storage module 308, in accordance with an instruction from another functional module, writes specified data into the memory 113 or the non-volatile memory 115, or reads stored image data or the like.

Figure 4:
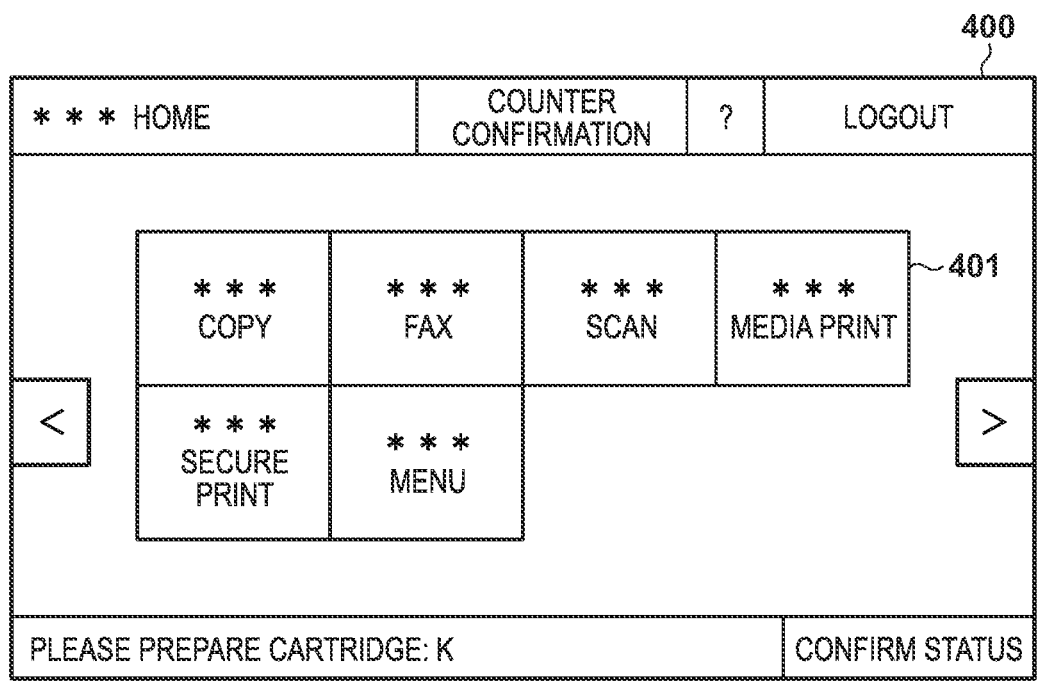
FIG. 4 depicts a view showing an example of a home screen displayed on a console unit of the image forming apparatus according to the embodiment.

FIG. 4 depicts a view showing an example of a home screen 400 displayed on the console unit 120 of the image forming apparatus 100 according to the embodiment.

In this home screen 400, buttons for functions (copying, faxing, scanning, media print, and the like) executable by the image forming apparatus 100 are displayed. A user can select a function to be executed by pressing a desired button on this screen.

When a media print button 401 is pressed, a list of image data (files) saved in the USB memory 101 connected to the image forming apparatus 100 is displayed on the console unit 120. The user selects a file to be printed from the list, performs various print settings and the like, and then causes printing to be executed.

FIGS. 5A to 7B depict views showing examples of screens displayed on the console unit 120 when the user presses the media print button 401 in the home screen 400 of FIG. 4. A user can select a file to be printed from these screens, perform a desired print setting, and then cause printing to be executed. FIG. 5A to FIG. 7B can be switched by the user performing a tap operation of display buttons 501 to 503 displayed on the respective screens.

In the media print selection window, the user can select a file to be printed from among the files saved in the USB memory 101. At this time, there are three types of methods for displaying images in the USB memory 101.

Figure 5A:
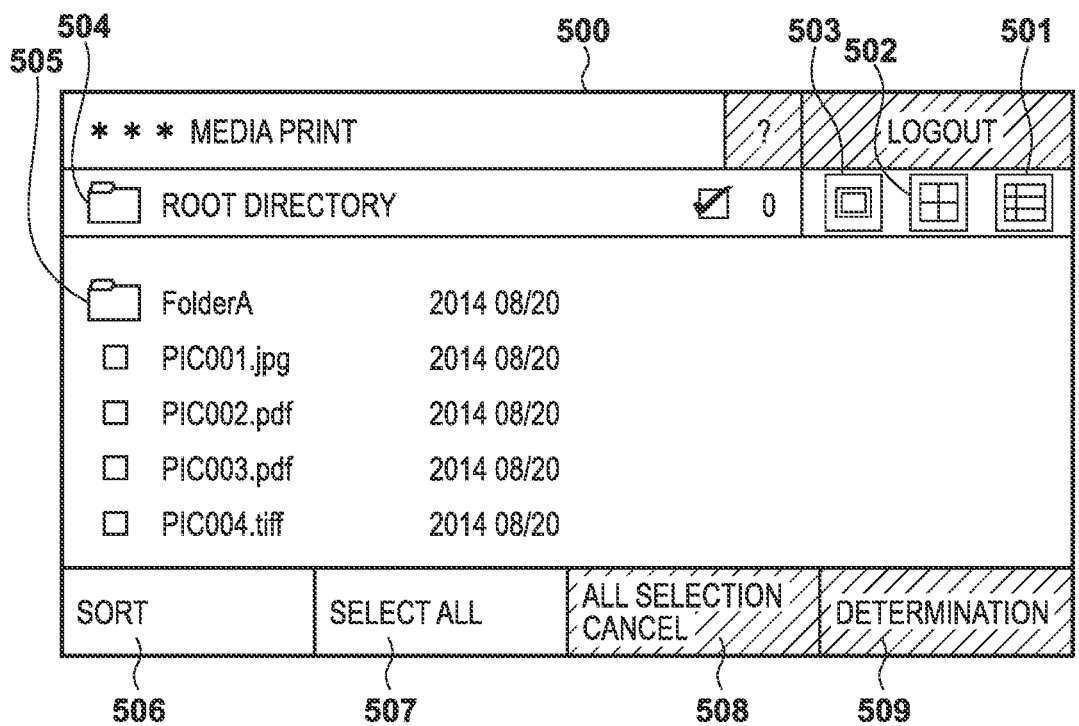
FIG. 5A depicts a view showing an example of a list display screen in which image files of the USB memory are listed by file name.

FIG. 5A depicts a view illustrating an example of a list display screen 500 in which image files of the USB memory 101 are listed by filename.

Figure 5B:
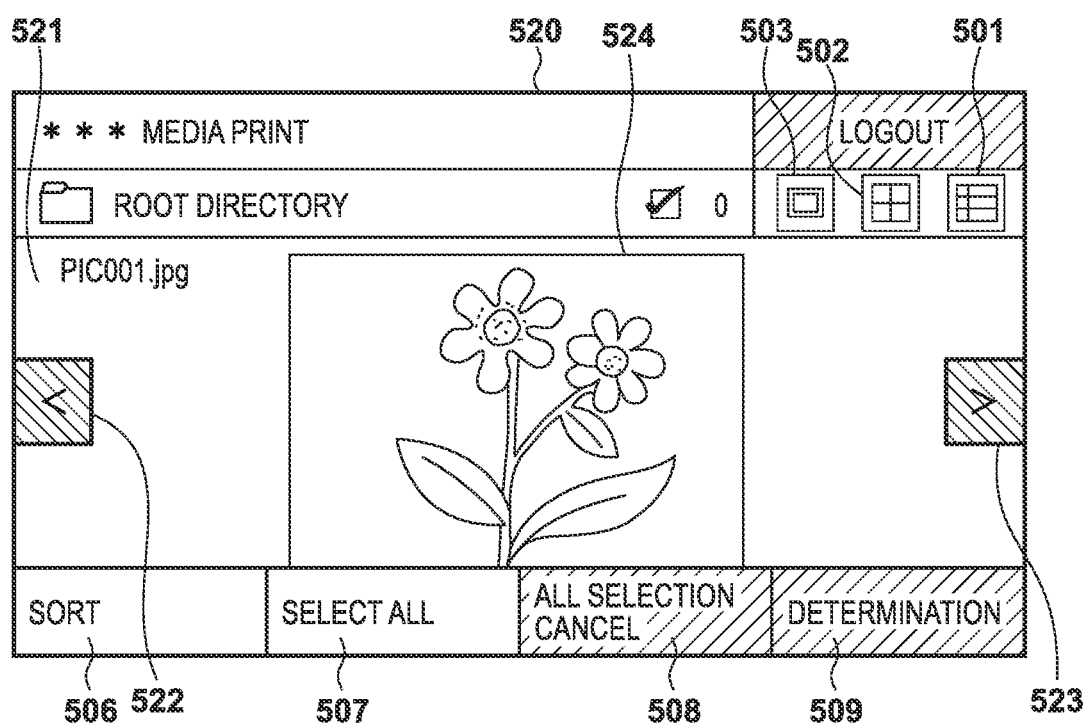
FIG. 5B depicts a view illustrating an example of a preview display screen of displaying image files in a USB memory file-by-file.
Figure 7A:
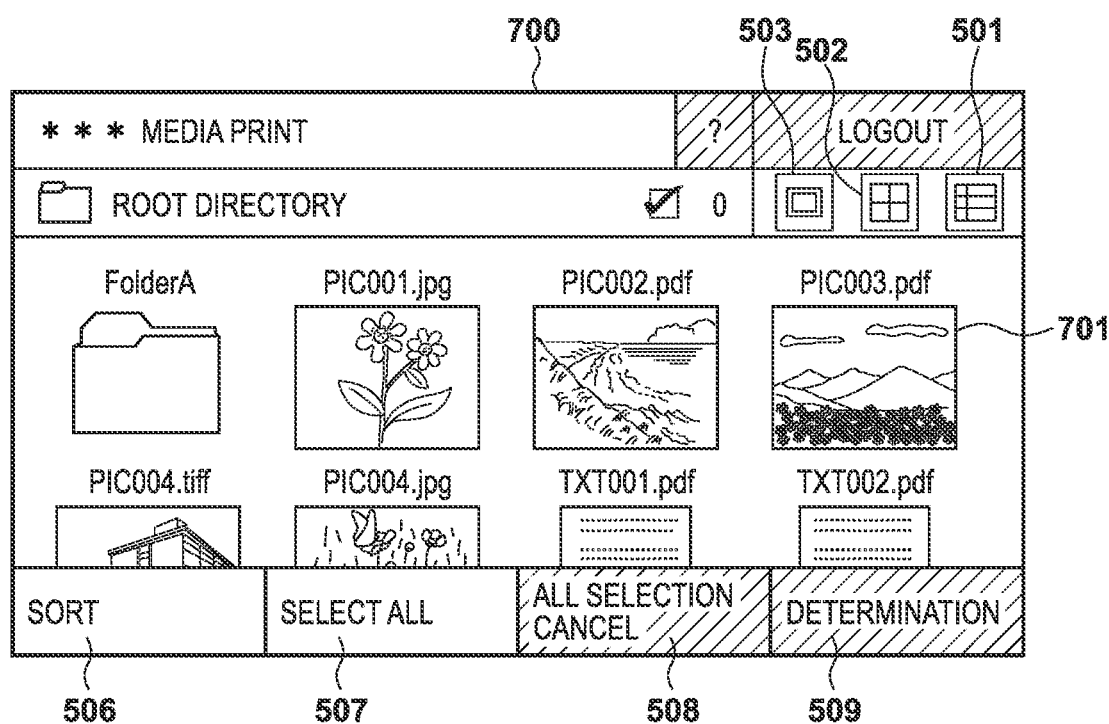
FIG. 7A depicts a view illustrating an example of a thumbnail display screen of displaying image data saved in the USB memory as thumbnail images.

The list display screen 500 is displayed when the user presses the list display button 501 on the list display screen 500. When the user presses a thumbnail display button 502 on the list display screen 500, a thumbnail display screen 700 shown in FIG. 7A is displayed. When the user presses a preview display button 503 on the list display screen 500, a preview display screen 520 shown in FIG. 5B is displayed. When the USB memory 101 includes a folder, the folder name is displayed on a folder name display field 504 when files in the folder are displayed. When the currently displayed hierarchy is the highest hierarchy or the USB memory 101 does not have a folder hierarchy, the folder name display field 504 displays a name indicating something to that effect.

In the embodiment, the USB memory 101 includes a folder (FolderA), and that this is a folder is displayed by a folder icon 505. When the user presses a sort button 506, a menu for changing the order of displaying the filenames (not shown) is displayed. When the user presses a select-all button 507, all files currently displayed are selected. When the user taps any file, the file is selected and an all selection cancel button 508 and a determination button 509 are enabled. If one or more files are selected, all selections are canceled when the user presses the all selection cancel button 508. When the determination button 509 is pressed while one or more files are selected, there is a transition to a media print setting screen 800 of FIG. 8. A selected file is checkmarked and the number of selected files is displayed on a number of selections display field 801.

When the user presses the media print button 401 on the home screen 400 and the list display screen 500 is transitioned to, the job sequence control module 304 receives a notification from the input control module 301, creates a job for generating an anticipation cache file, and starts processing the job. The image input control module 305 receives a job start instruction, and reads image data of the USB memory 101 via the USB control module 303. The required parameters are set, and the image processing module 309 is requested to process the read image data. Upon being notified of the completion of the generation of the image data from the image processing module 309, the image input control module 305 stores the generated image data as a cache file in the memory 113 by the storage module 308. The size of the image data to be generated at this time may be preview size, thumbnail size, or both of preview size and thumbnail size.

FIG. 5B depicts a view illustrating an example of the preview display screen 520 for displaying image files in the USB memory 101 on a file-by-file basis. In FIG. 5B, the same parts as those of FIG. 5A are denoted by the same reference numerals.

When the user presses the preview display button 503 to display the preview display screen 520, the content of a file can be confirmed in detail. This is useful when the content of an image is not known by the filename alone, or when similar images are included and the images are to be confirmed in detail. The name of the file being displayed is displayed in a file name field 521. When a previous file display button 522 is pressed, the immediately previous image is displayed. When a next file display button 523 is pressed, the next image is displayed. In the preview display screen 520, an image is selected by tapping a previewed image 524. Operation after one or more images are selected is similar to that for the list display screen 500 in FIG. 5A.

Upon transitioning to the preview display screen 520 by pressing the media print button 401 from the home screen 400 or the preview display button 503 of FIG. 5A or FIG. 5B, the job sequence control module 304 receives a notification from the input control module 301, creates a preview display job, and starts processing the preview display job. The image input control module 305 receives a job start instruction, reads image data of the USB memory 101 via the USB control module 303, sets required parameters, and requests the image processing module 309 to process the read image data. Upon being notified of the completion of the processing of the image data from the image processing module 309, the image input control module 305 notifies the display control module 302 to display the preview image on the console unit 120.

If processing is not performed for a predetermined amount of time in a state where the user has displayed the preview image, the job sequence control module 304 receives a notification from the input control module 301, creates a job for generating an anticipation cache file, and starts processing the job. When the user operates the console unit 120 to instruct a different image from that being displayed, the job sequence control module 304 creates a preview display job and starts processing the preview display job.

Figure 6:
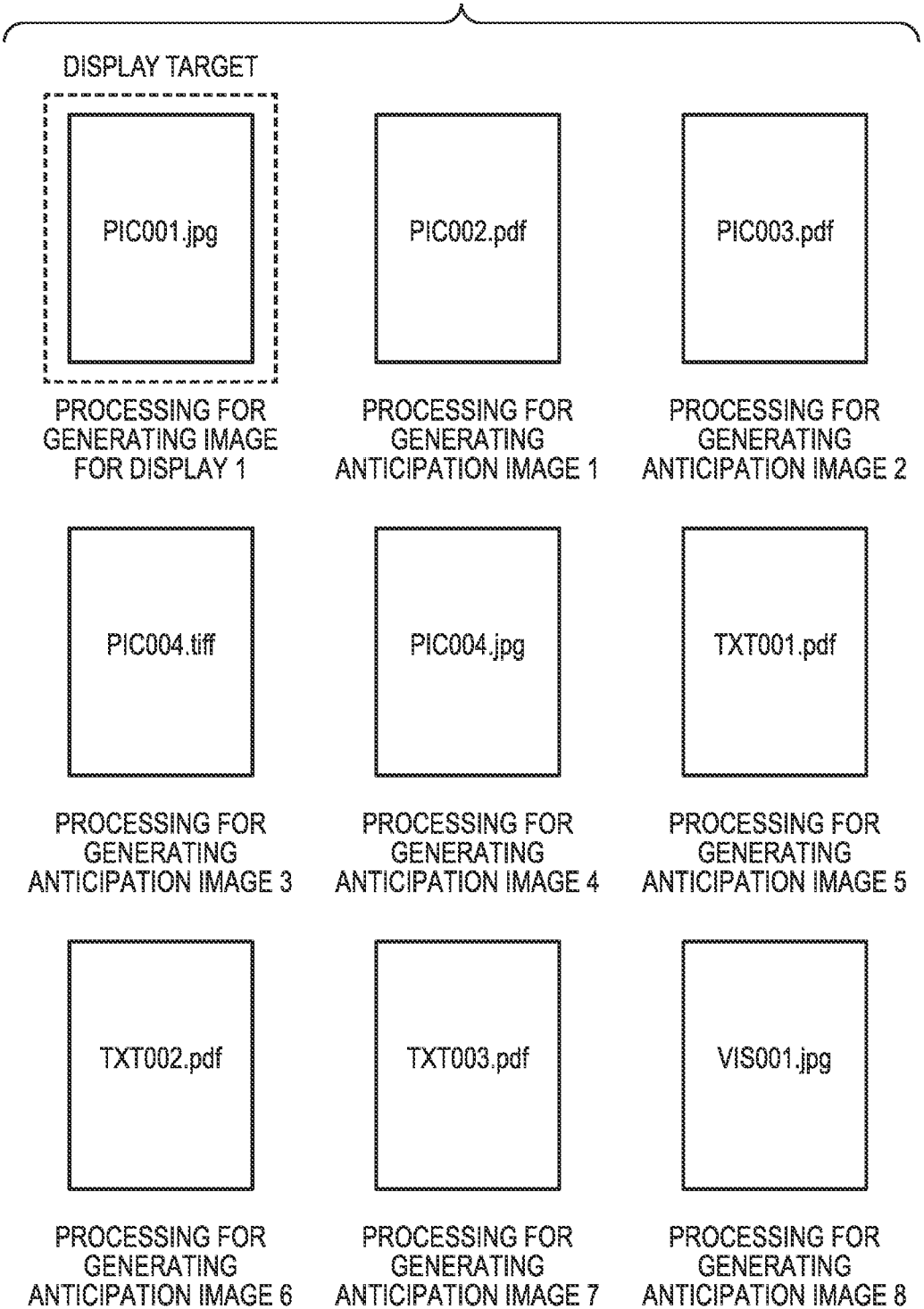
FIG. 6 depicts a view for describing a target of processing for generating display image data for the preview display screen shown in FIG. 5B and targets of processing for an anticipation cache.

FIG. 6 depicts a view for describing a target of processing for generating display image data for the preview display screen 520 illustrated in FIG. 5B, and targets anticipation cache processing.

The USB memory 101 includes a plurality of files shown in FIG. 6. When the user presses the media print button 401 or the preview display button 503, the input control module 301 notifies a request for generating display image data of a PIC001.jpg file selected as a display target, for example. The image of PIC001.jpg is displayed on the LUI screen in accordance with the processing of respective processing modules (FIG. 5B).

In this state, if the user does not continue to perform an operation in a predetermined amount of time, for example, by confirming the image, the input control module 301 notifies the request to generate the image data for the anticipation cache of PIC002.pdf which is the next image for PIC001.jpg. When the generation processing of the image data for caching of PIC002.pdf is completed in this manner, processing to generate image data for the anticipation cache of files saved in the USB memory 101 is performed, for the subsequent PIC003.pdf, PIC004.tiff, and so on.

FIG. 7A depicts a view illustrating an example of the thumbnail display screen 700 for displaying, by thumbnail images, image data saved in the USB memory 101. In FIG. 7A, the same parts as those of FIG. 5A are denoted by the same reference numerals.

The thumbnail display screen 700 is displayed when the user presses the thumbnail display button 502, and, by this screen, the user can confirm an overview of the files stored in the USB memory 101. Since the USB memory 101 saves a large number of files, the thumbnail display screen 700 is useful when the approximate contents of the included files are desired to be quickly known, even when, for example, every single detail of each file is not known. In this thumbnail display screen 700, an image is selected by the user tapping a thumbnail image 701 of a file to be printed. Operation after one or more preview images are selected is similar to that for the list display screen 500.

When there is a transition from the home screen 400 to the thumbnail display screen 700 in accordance with a press of the media print button 401 or the preview display button 503, the job sequence control module 304 receives a notification from the input control module 301, creates a preview display job, and starts processing the preview display job. When display of a preview image displayed on the console unit 120 is completed and processing has not been performed for a predetermined amount of time, the job sequence control module 304 receives a notification from the input control module 301, creates an anticipation cache file generation job, and starts processing the anticipation cache file generation job, similarly to with the preview display described above.

Figure 7B:
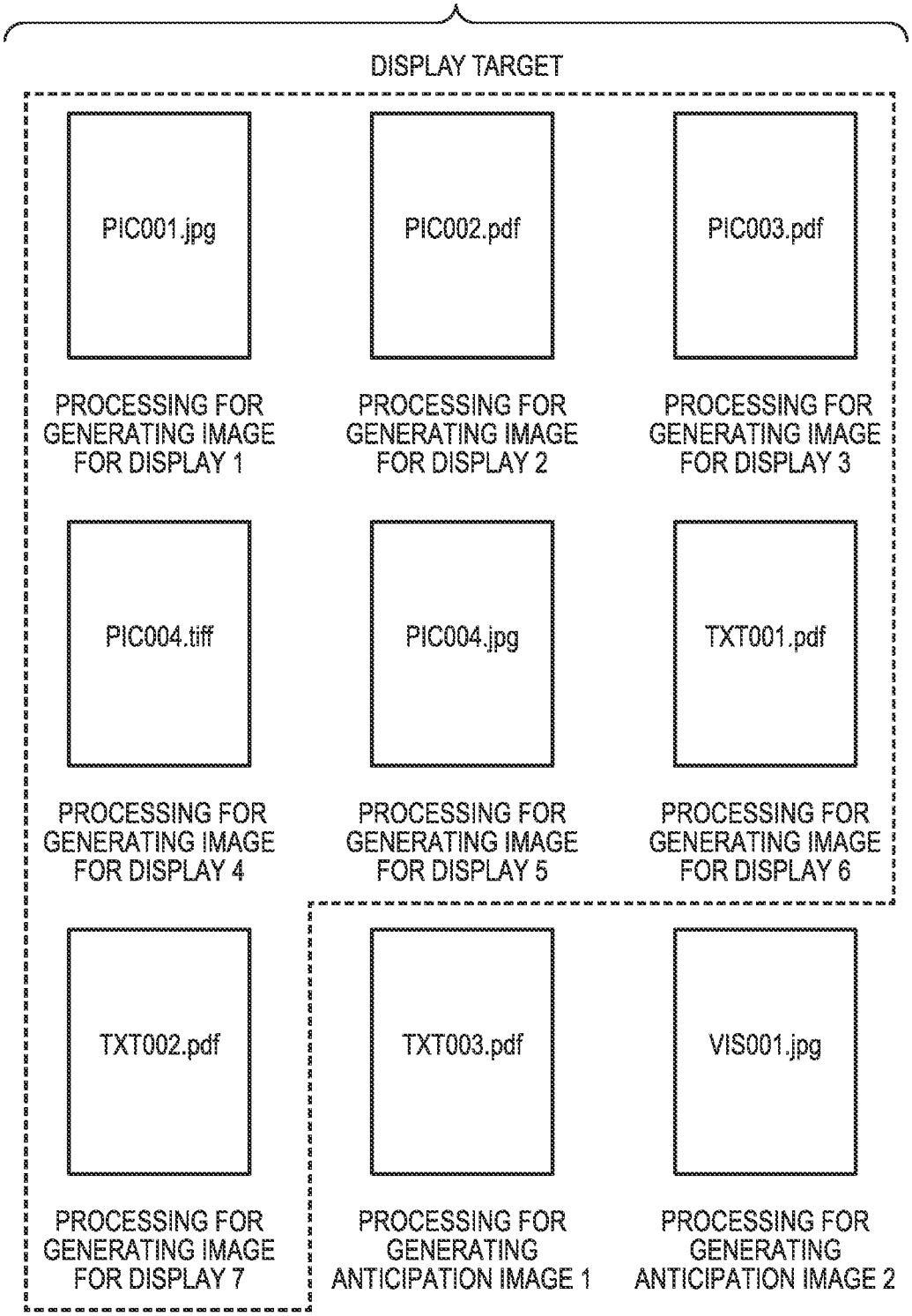
FIG. 7B depicts a view for describing targets of processing for generating display image data for the preview display screen shown in FIG. 7A and targets of processing for generating image data for an anticipation cache.

FIG. 7B depicts a view for describing targets of processing for generating display image data of the preview display screen shown in FIG. 7A and targets of processing for generating image data for an anticipation cache.

The USB memory 101 includes a plurality of files as shown in FIG. 7B. When the user presses the media print button 401 or the preview display button 503, the input control module 301 notifies a request for generating image data for a thumbnail display of the PIC001.jpg file. Accordingly, the thumbnail image of PIC001.jpg is displayed on the LUI screen by the processing of the respective processing modules. Next, display image generation requests for PIC002.pdf, PIC003.pdf, . . . , and TXT002.pdf are processed and results are displayed on the LUI (FIG. 7A). At this time, when operation is not performed for a predetermined amount of time by a user confirming an image or the like, the input control module 301 notifies a request to generate image data for anticipation cache of TXT003.pdf which is the next image after TXT002.pdf. When the processing to generate cache image data for TXT003.pdf is completed, processing to generate the image data for the anticipation cache of the images in the USB memory 101 is performed for VIS001.jpg, which is next, and so on.

Figure 8:
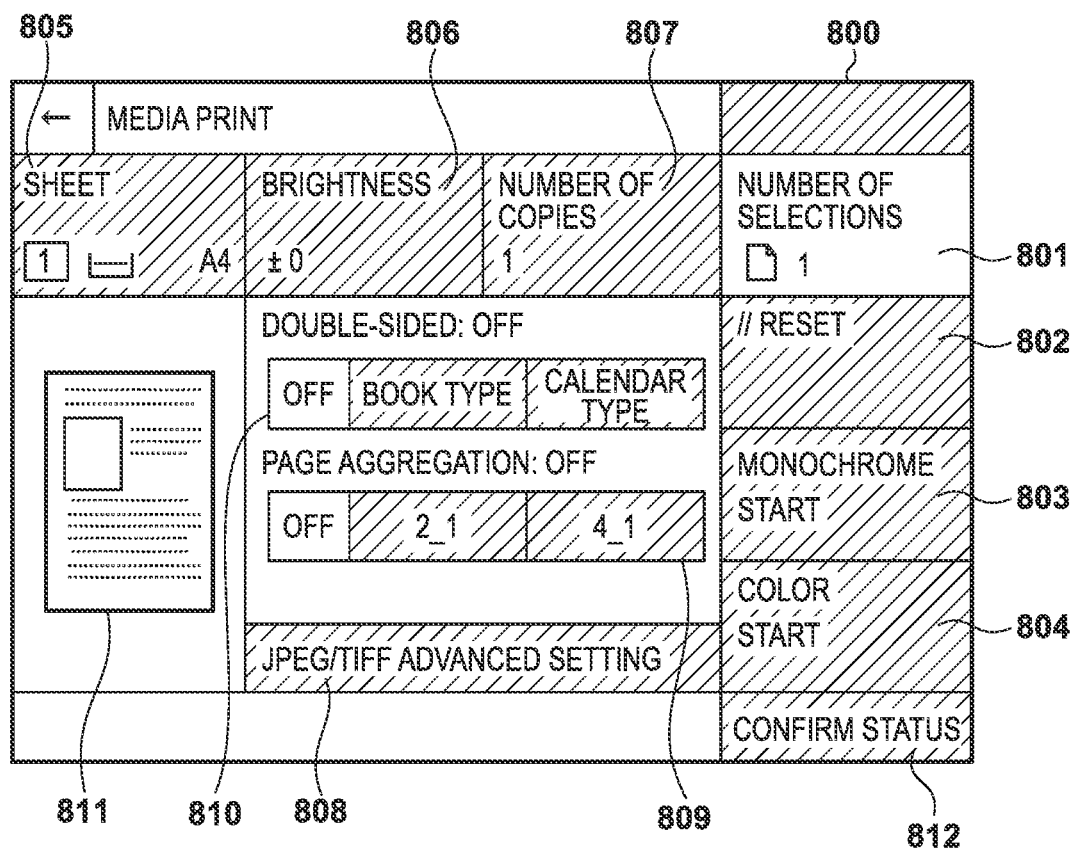
FIG. 8 depicts a view showing an example of a media print setting screen displayed after one file is selected and a determination button is pressed on the screens of FIG. 5A or 7A.

FIG. 8 depicts a view illustrating an example of the media print setting screen 800 which is displayed after one file is selected on the screens of FIGS. 5A to 7B and the determination button 509 is pressed.

A number of selected files display field 801 indicates the number of selected files, and indicates that one file has been selected in FIG. 8. A sheet setting field 805 displays a currently selected sheet and a sheet feed source. The user can change the sheet feed source by tapping the sheet setting field 805, and can select a sheet feed source in which a desired sheet size is set. A brightness setting field 806 enables the brightness of an image to be set. A number of copies setting field 807 enables a number of copies to be set. When the user presses an advanced setting field 808, there is a transition to an advanced setting screen (not shown) and the user is able to make, for example, advanced settings for an image processing function. A double-sided setting field 810 can be set to single-sided or double-sided, and book type or calendar type can be set in the case of double-sided. An N-in-one setting field 809 is enables an aggregation setting such as 2 in 1, for example. A preview field 811 displays a screen of an illustration for when double-sided or page aggregation is set, instead of a preview of the selected image. This screen example shown in FIG. 8 is an illustration for when there is a single-sided setting and there is no page aggregation. When the user presses a reset button 802, all settings changed by the respective setting fields can be restored. After performing desired settings in the respective setting fields, the user presses a monochrome start button 803 when desiring to print in monochrome, and presses a color start button 804 when desiring to print in color. When the user presses a status confirmation button 812, there is a transition to a status confirmation screen (not shown), and the user can confirm the job status or the like.

Figure 9:
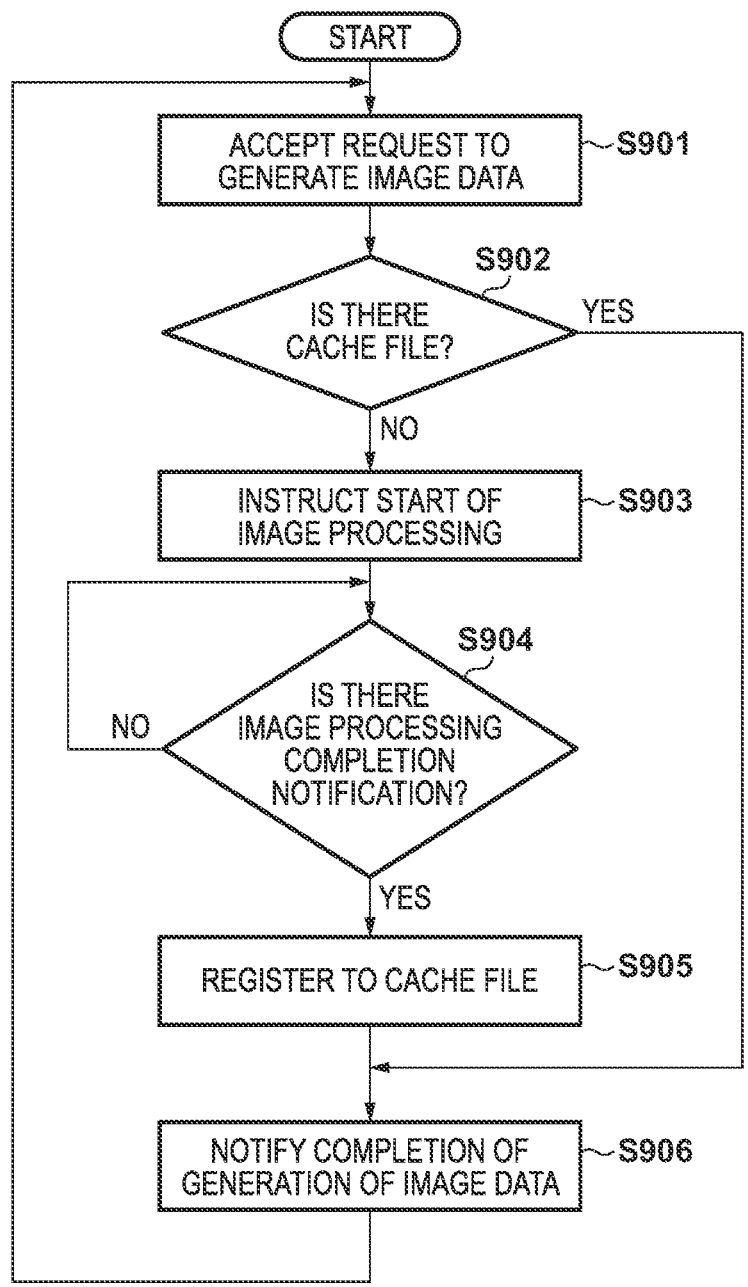
FIG. 9 is a flowchart for describing a process of displaying a preview display and a thumbnail display screen in a typical image forming apparatus.

FIG. 9 is a flowchart for describing processing for displaying a preview display or a thumbnail display screen in a typical image forming apparatus.

In step S901, by accepting a request to display a preview display screen or a thumbnail display screen from a user, a request to generate image data is accepted. Then, the processing proceeds to step S902, where it is determined whether or not the image data requested to be generated is stored in a storage module as a cache file, and if it is stored as the cache file, the processing proceeds to step S906, and the fact that the generation of the image data is completed and the address of the cache file are notified and the processing proceeds to step S901. As a result, the instructed image can be displayed on the console unit 120 based on the notified address by using the cached image data.

On the other hand, when the image data for which the generation request was received is not in the cache file in step S902, the processing proceeds to step S903, required parameters are set, and image generation processing is requested. In step S904, if there is an image processing completion notification, the processing proceeds to step S905, and the generated image data is registered as the cache file. Then, the processing proceeds to step S906, the fact that generation completed and the address of the registered image data are notified, and the processing proceeds to step S901. If there is no image generation completion notification in step S904, the processing waits in step S904 until there is an image generation completion notification. If no user operation is performed on the console unit for a certain period of time, an anticipation cache file generation request is issued. Processing thereafter is similar to that in the case where a display request is accepted.

Figure 14:
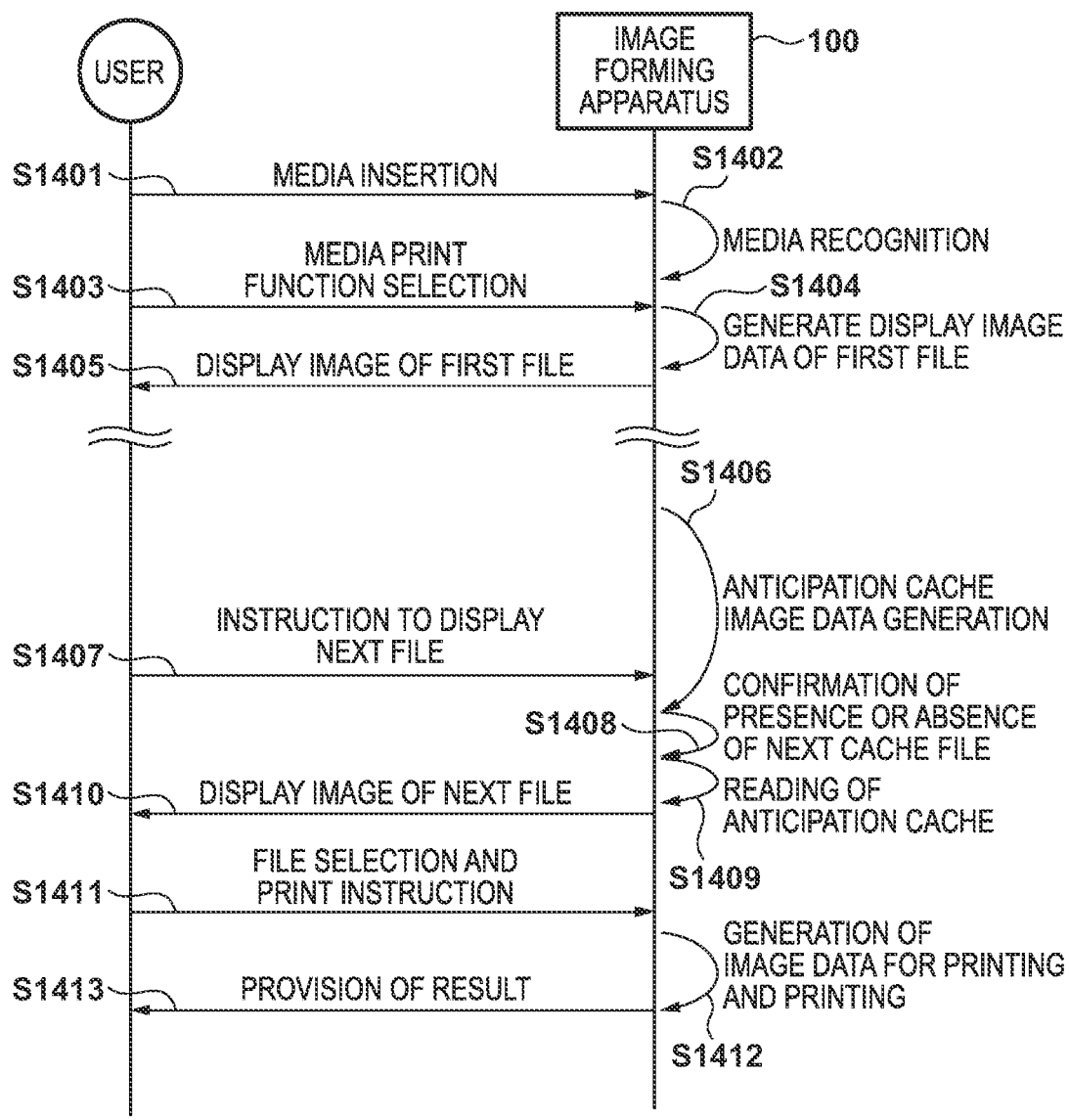
FIG. 14 is a sequence diagram for describing a typical processing sequence.

FIG. 14 is a sequence diagram for describing a general processing sequence. In FIG. 14, steps S1401 to S1405 and steps S1410 to S1413 are the same as steps S101 to S105 and steps S107 to S112 of the sequence diagram of the above-described FIG. 1B, and therefore descriptions thereof are omitted.

Here, in step S1404, a display image of a first file PIC001.jpg in the USB memory is generated and displayed on the LUI. After that, in a state where there is no user operation, and generation and registration of cache files up to PIC002.pdf, PIC003.pdf, and PIC004.tiff has completed, in step S1406, processing for a cache file of TXT001.pdf which takes time to process is executed. During the processing for generating image data in step S1406, a request for displaying the next file PIC004.tiff is inputted in accordance with a user operation in step S1407. However, this display request is not processed until the image generation processing of TXT001.pdf completes. That is, after the processing to generate the image data of TXT001.pdf indicated in step S1406 is completed, in step S1408, the PIC004.tiff display request is received and the presence or absence of a cache file for PIC004.tiff is confirmed. Then, in step S1409, the image of the cached PIC004.tiff is read and displayed on the LUI.

In this processing, it is not possible to accept a request for generation of subsequent image data until after the notification of completion of generation of image data. After the user displays the first image, if there is no user operation for a predetermined period, an anticipation cache job is inputted. At this time, if the anticipation cache target image data is, for example, a PDF for which generation of image data takes time, it is not possible to promptly accept a display request even if the user operates the console unit to make a request to display the next image after the anticipation cache job is input. That is, the display request for the next image is accepted after the image data for the anticipation cache of the PDF image is generated. Therefore, even if image data corresponding to the display request is already cached and can be displayed immediately, the completion of the processing being executed for the PDF is awaited. As described above, there is a problem that the display of image data that is already cached is made to wait because of anticipation cache processing that is being performed with the original intention of shortening the time until display.

First Embodiment

Therefore, in a first embodiment, description is given by an example in which, the image input control module 305 and the image processing module 309 operate on separate threads, and if image data corresponding to a display request is cached, the image to be displayed will be displayed without waiting for the completion of the generation of image data currently being processed.

Figure 10:
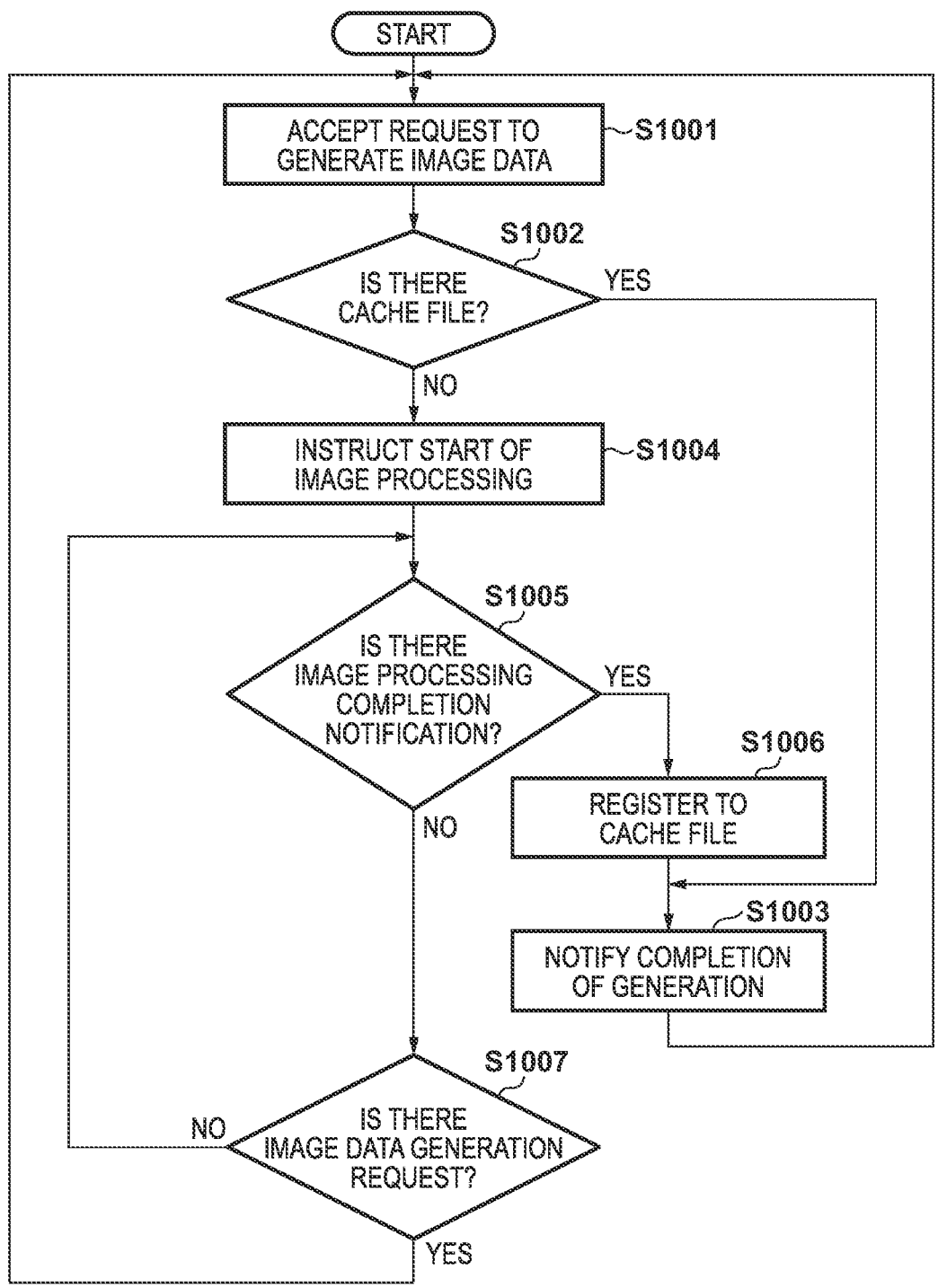
FIG. 10 is a flowchart for describing processing in an image forming apparatus according to a first embodiment.

FIG. 10 is a flowchart for describing processing in the image forming apparatus 100 according to the first embodiment of the present invention. Note that, since the processing shown in this flowchart is realized by the CPU 111 executing programs stored in the non-volatile memory 115, the CPU 111 will be described here as the subject of the processing. It is similar for subsequent flowcharts. Here, the image input control module 305 and the image processing module 309 are configured to operate on different threads.

This processing is started by the CPU 111 accepting, from a user, a request to display the preview display screen 520 or the thumbnail display screen 700, and, by this, the CPU 111 in step S1001 accepts a request to generate image data. The CPU 111 then proceeds to step S1002, where it determines whether or not a cache file of the image data requested to be generated is stored in the memory 113. If it is determined that there is the cache file, the processing proceeds to step S1003, and the CPU 111 ends generation of the image data, displays the requested image on the console unit 120 based on the address of the cache file stored in the memory 113, and proceeds to step S1001.

On the other hand, if it is determined in step S1002 that there is no cache file, the processing proceeds to step S1004, where required parameters are set, and the image processing module 309 which operates on another thread is requested to generate image data. After this request, a request for generation of subsequent image data can be accepted without waiting for a notification of completion of generation of image data. If an image processing completion notification is received prior to a request to generate subsequent image data in step S1005, the CPU 111 proceeds from step S1005 to step S1006, registers the generated image data as the cache file in the memory 113, and proceeds to step S1003.

On the other hand, if the next image data generation request arrives prior to the image processing completion notification, the processing proceeds from step S1005 to step S1007 and then to step S1001 to accept the image data generation request.

As described above, according to the first embodiment, it is possible to accept a request to generate next image data even when the generation processing of the image data currently being processed takes a long time. If image data corresponding to the next generation request is cached, it is possible to display this image whose generation is requested, prior to the completion of the generation of the image data currently being processed.

When the image data currently being processed is image data for an anticipation cache, if a request to display an image registered as a cache file is received prior to the completion of the image processing for the anticipation cache, the image requested to be displayed can be immediately displayed.

Figure 15:
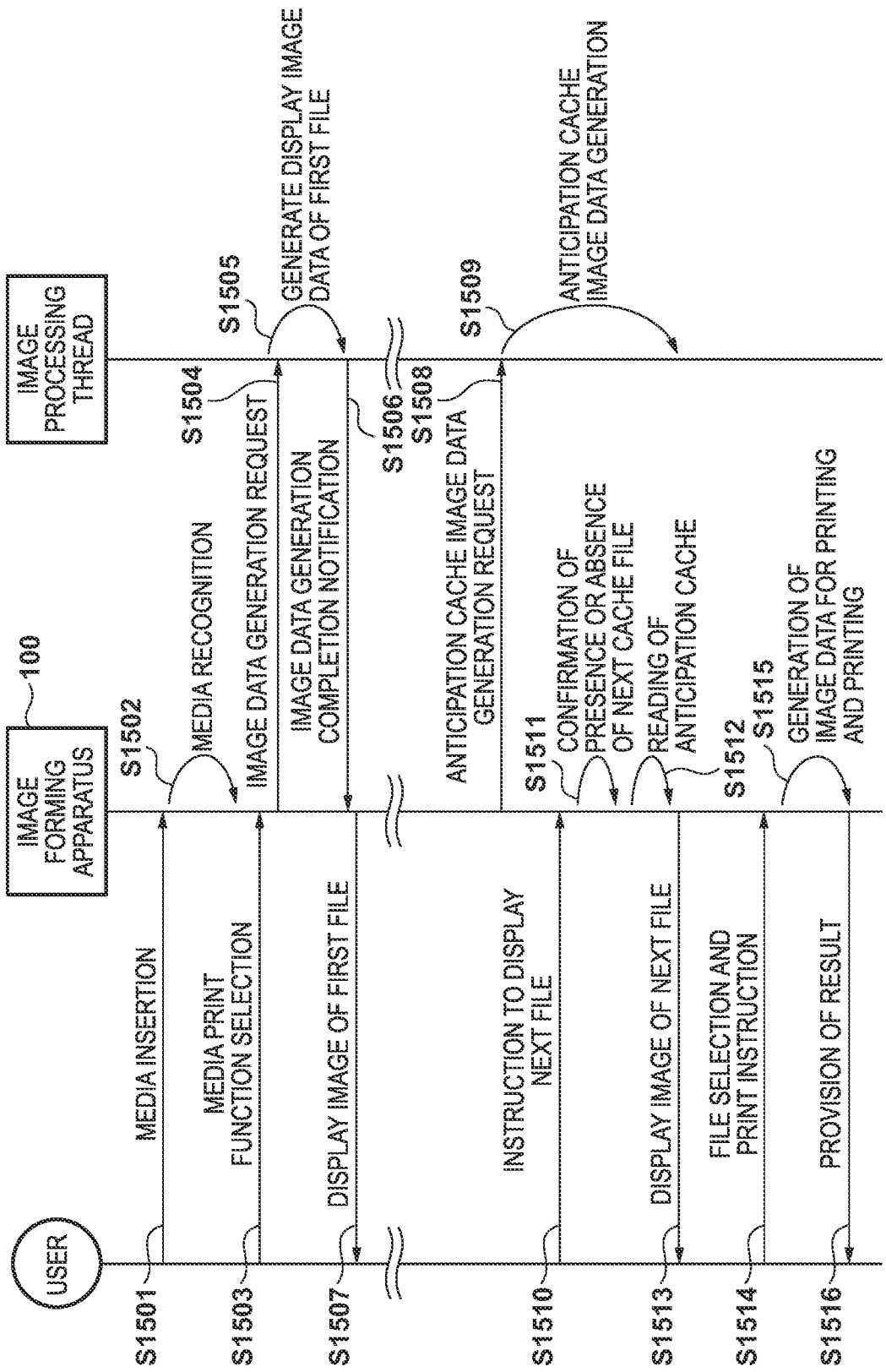
FIG. 15 is a sequence diagram for describing an example of a processing sequence in the first embodiment of the present invention.

FIG. 15 is a sequence diagram for describing an example of a processing sequence in the first embodiment of the present invention.

In step S1501, the user inserts the USB memory 101 into the image forming apparatus 100. As a result, the image forming apparatus 100 recognizes that the USB memory 101 has been inserted in step S1502. Next, in step S1503, the user presses the media print button 401 on the LUI of the image forming apparatus 100. As a result, the image input control module 305 in step S1504 requests the image processing module 309 (hereinafter, referred to as "image processing thread") which operates on a separate thread to generate image data of PIC001.jpg. Then, in step S1505, the image processing thread generates the display image data of PIC001.jpg to store in the memory 113, and when the generation of the image data is completed, notifies the image input control module 305 of the completion of the generation of the image data in step S1506. In this way, in step S1507, the image forming apparatus 100 displays the image of PIC001.jpg on the LUI based on the display image data stored in the memory 113.

After that, in a state where there is no user operation, and generation and registration of cache files up to PIC002.pdf, PIC003.pdf and PIC004.tiff has completed, the image processing thread is requested to generate a cache file of TXT001.pdf, which takes time to process (step S1508). As a result, the image processing thread executes the processing to generate the image data of TXT001.pdf in step S1509. During the processing to generate the image data of the TXT001.pdf, in step S1510, a request for displaying the next file, PIC004.tiff, is inputted in accordance with a user operation. At this time, upon accepting the display request for PIC004.tiff, in step S1511, the image input processing module 305 confirms the presence or absence of a cache file for PIC004.tiff. If the cache file exists, in step S1512, the cached image data for PIC004.tiff is read, and, in step S1513, displayed on the LUI. By this, a user can confirm the PIC004.tiff and, in step S1514, select this file and print it. In this manner, the image forming apparatus 100 can, in step S1515, generate to-be-printed image data for PIC004.tiff and execute printing of this image data, and, in step S1516, provide the result to the user.

As described above, according to the first embodiment, even when a request to display a subsequent file occurs during generation of an anticipation cache, image data of the file whose display is requested can be obtained and displayed without waiting for the generation of the anticipation cache to complete.

Second Embodiment

Next, a second embodiment of the present invention will be described. In the second embodiment, description is given by an example of interrupting image processing that is currently underway when the image input control module 305 and the image processing module 309 operate in separate threads, and also a request for generating image data for display arrives during processing to generate image data. Note that, since the hardware configuration and the like of the image forming apparatus 100 according to the second embodiment are similar to those of the first embodiment described above, descriptions thereof are omitted.

Figure 11:
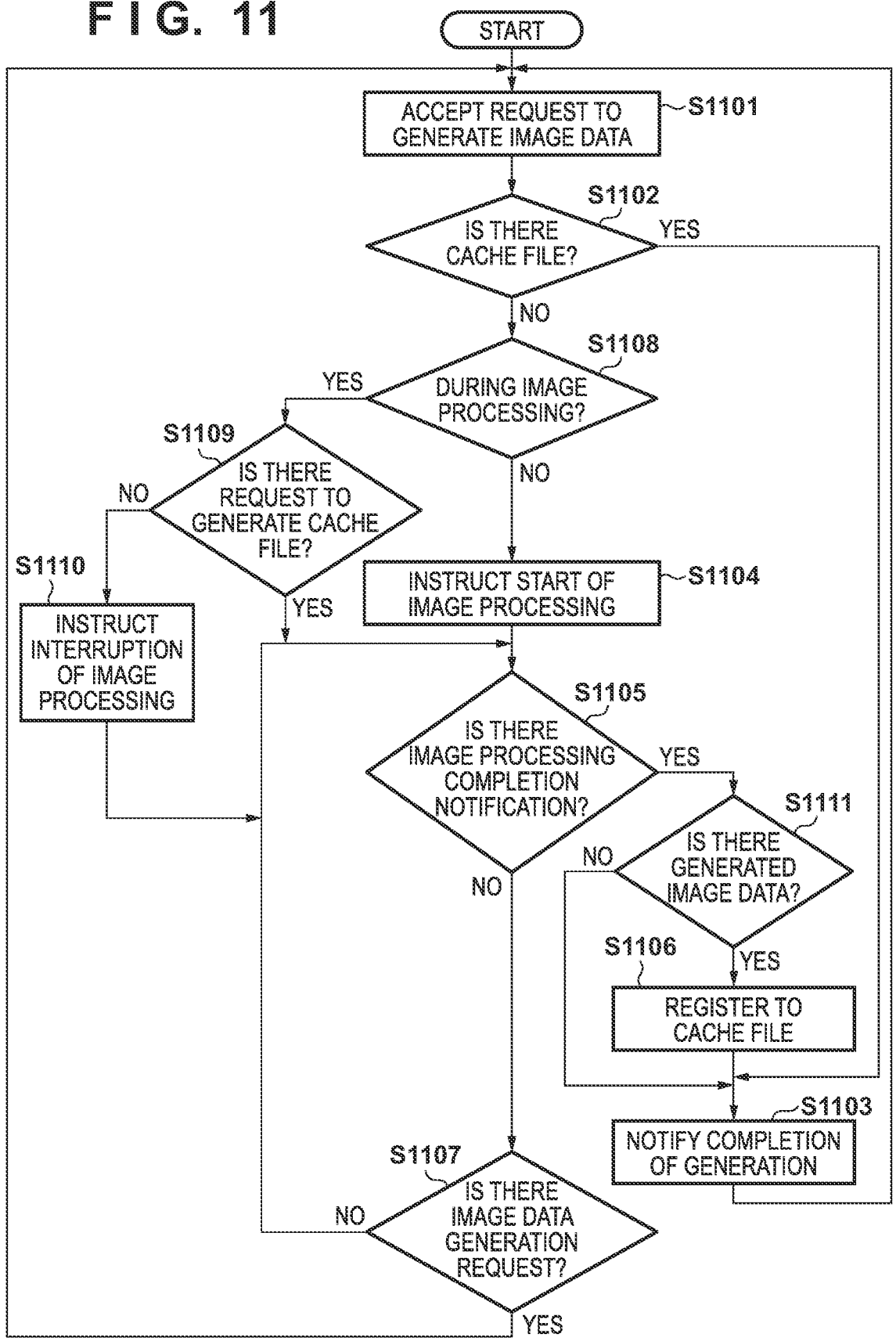
FIG. 11 is a flowchart for describing processing in an image forming apparatus according to a second embodiment.

FIG. 11 is a flowchart for describing processing in the image forming apparatus 100 according to the second embodiment of the present invention. Note that the processing shown in this flowchart is implemented by the CPU 111 executing programs stored in the non-volatile memory 115. It is similar for subsequent flowcharts. The image input control module 305 and the image processing module 309 are configured to operate on different threads. Note that the processing of step S1101 to step S1107 of FIG. 11 is the same as step S1001 to step S1007 of FIG. 10 described above, and therefore description thereof is omitted.

Here, after the request for generating image data is accepted in step S1101, if a cache file is not found in step S1102, the processing proceeds to step S1108, and the CPU 111 determines whether or not a processing completion notification for the generation of image data has arrived. If the processing completion notification has not been received, the processing proceeds to step S1109 and the CPU 111 determines whether the request for generating image data is in accordance with a request for a preview image or in accordance with an anticipation cache request for generating an anticipation cache. Here, if it is determined that this is generation of image data in accordance with the request for a preview display, the processing proceeds to step S1110, and the CPU 111 instructs the image processing module 309 to interrupt image processing, then the processing proceeds to step S1105, and the CPU 111 waits for the processing completion notification. On the other hand, in a case of generation of image data in accordance with the anticipation cache request, the processing proceeds to step S1105 and the processing completion notification of the image processing currently being processed is awaited.

In step S1110, the image processing module 309, which received the interruption instruction, interrupts the processing for generating the image data, and when the interruption processing completes, performs a notification of the completion of the processing. When the processing in accordance with the interruption completes, the image input control module 305 that received the processing completion notification proceeds from step S1111 to step S1103 because there is no generated image data, and notifies the display control module 302 of the completion of the generation of image data without registering a cache file. At this time, the display control module 302 receives the completion notification, but does not receive any information about the storage location of the image data, and therefore, does not perform any processing.

As described above, according to the second embodiment, when a request to generate image data for display arrives during processing to generate image data, processing to generate image data for display is more likely to be performed faster by interrupting the image processing for which processing is underway.

Figure 16:
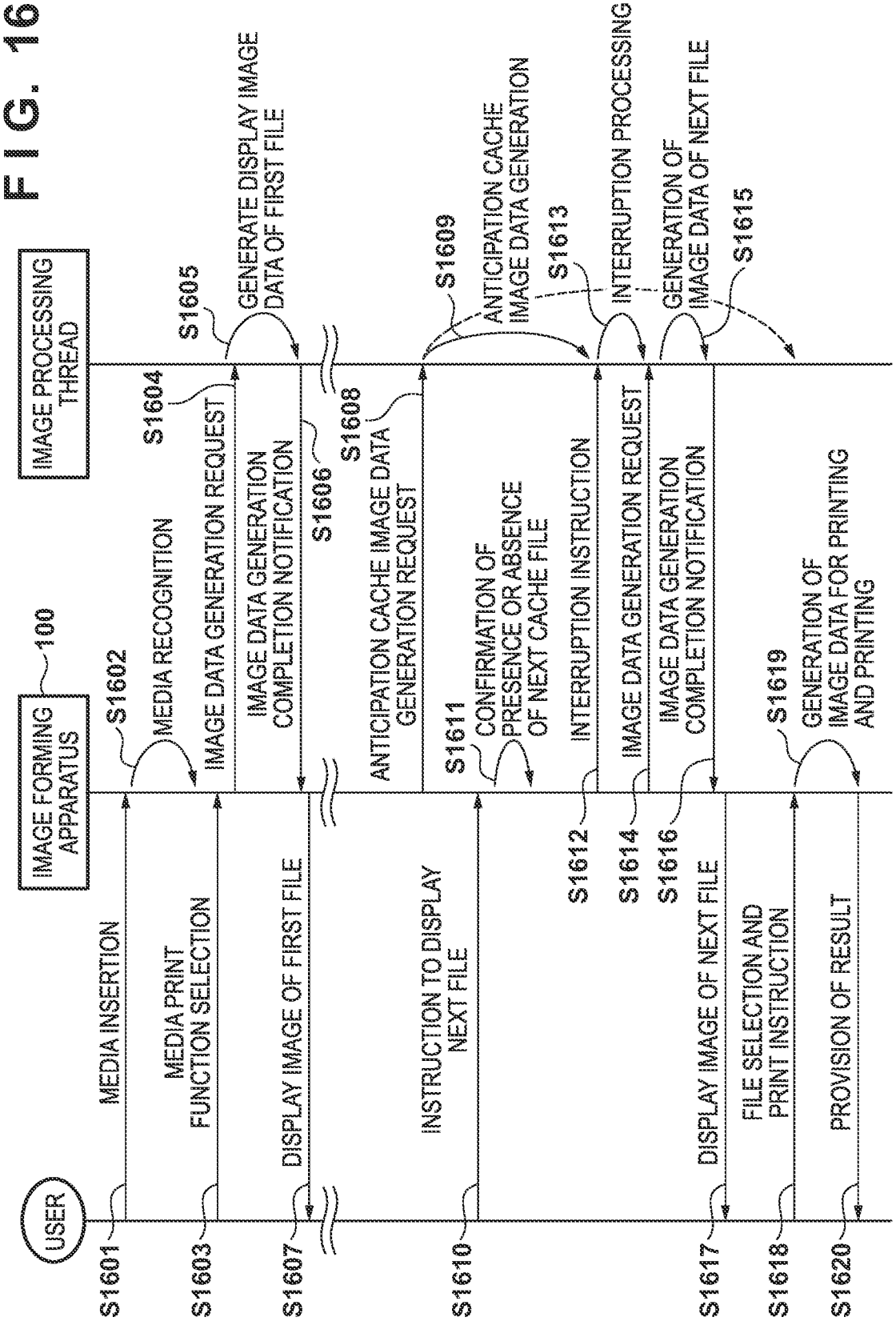
FIG. 16 is a sequence diagram for describing an example of a processing sequence in the second embodiment of the present invention.

FIG. 16 is a sequence diagram for describing an example of a processing sequence in the second embodiment of the present invention.

In step S1601, when the user inserts the USB memory 101 into the image forming apparatus 100, the image forming apparatus in step S1602 recognizes that the USB memory 101 has been inserted. Next, in step S1603, the user presses the media print button 401 on the LUI of the image forming apparatus 100. As a result, the image input control module 305, in step S1604, requests the image processing module 309 (hereinafter referred to as the image processing thread) which operates in another thread to generate image data of PIC001.jpg. As a result, the image processing thread generates image data for displaying PIC001.jpg to store in the memory 113 in step S1605, and, in step S1606, notifies the image input control module 305 of the completion of this generation. As a result, PIC001.jpg is displayed on the LUI in step S1607 based on the image data stored in the memory 113.

After that, in a state where there is no user operation, and generation and registration of cache files up to PIC002.pdf has completed, in step S1608, the image processing thread is requested to generate a cache file of PIC003.pdf, which takes a long time to process. As a result, the image processing thread executes processing to generate image data for PIC003.pdf in step S1609, and, during the processing to generate the image for PIC003.pdf, a display request for the next file PIC004.tiff is inputted by the user operation in step S1610. At this time, the image input processing module 305 receives the display request for PIC004.tiff, and, in step S1611, confirms the presence or absence of a cache file for PIC004.tiff. Here, since no cache file is found, the image input control module 305 notifies the image processing thread to interrupt processing in step S1612. As a result, the image processing thread, in step S1613, interrupts the processing for generating the image data for PIC003.pdf.

Then, in step S1614, the image processing thread is requested to generate image data for PIC004.tiff. As a result, the image processing thread generates the requested display image data for PIC004.tiff to store in the memory 113 in step S1615, and notifies the image input control module 305 of the completion of the generation of the image data in step S1616. In this way, in step S1617, the image forming apparatus 100 can display an image for the next file, PIC004.tiff, on the LUI based on the display image data stored in the memory 113. Then, in step S1618, the user confirms the displayed image for PIC004.tiff, and instructs selection and printing. As a result, in step S1619, the image forming apparatus 100 can generate image data for printing for PIC004.tiff, execute printing, and, in step S1620, provide the user with the product of printing.

If the interruption processing of step S1613 is not executed, the anticipation cache image data generating process is continued for the duration indicated by the dotted line in FIG. 16, which means that the user has to wait for a long time before display or printing for the next file.

Note that, in the first and second embodiments described above, the order in which anticipation cache file generation requests are issued may be controlled in accordance with the file extension. That is, the input control module 301 first issues generation requests for JPEG/TIFF files when issuing requests to generate anticipation cache files. As a result, the timing for the issuance of an anticipation cache request for a PDF file, which requires a relatively long processing time, is delayed, and it is possible to prevent the occurrence of a situation of having to wait for the processing for a PDF file to complete.

Third Embodiment

Next, a third embodiment of the present invention will be described. In the third embodiment, the image input control module 305 and the image processing module 309 operate on different threads, and furthermore an image processing thread is held for each file type. Note that, since the hardware configuration and the like of the image forming apparatus 100 according to the third embodiment is similar to that of the first embodiment described above, descriptions thereof are omitted.

Figure 12:
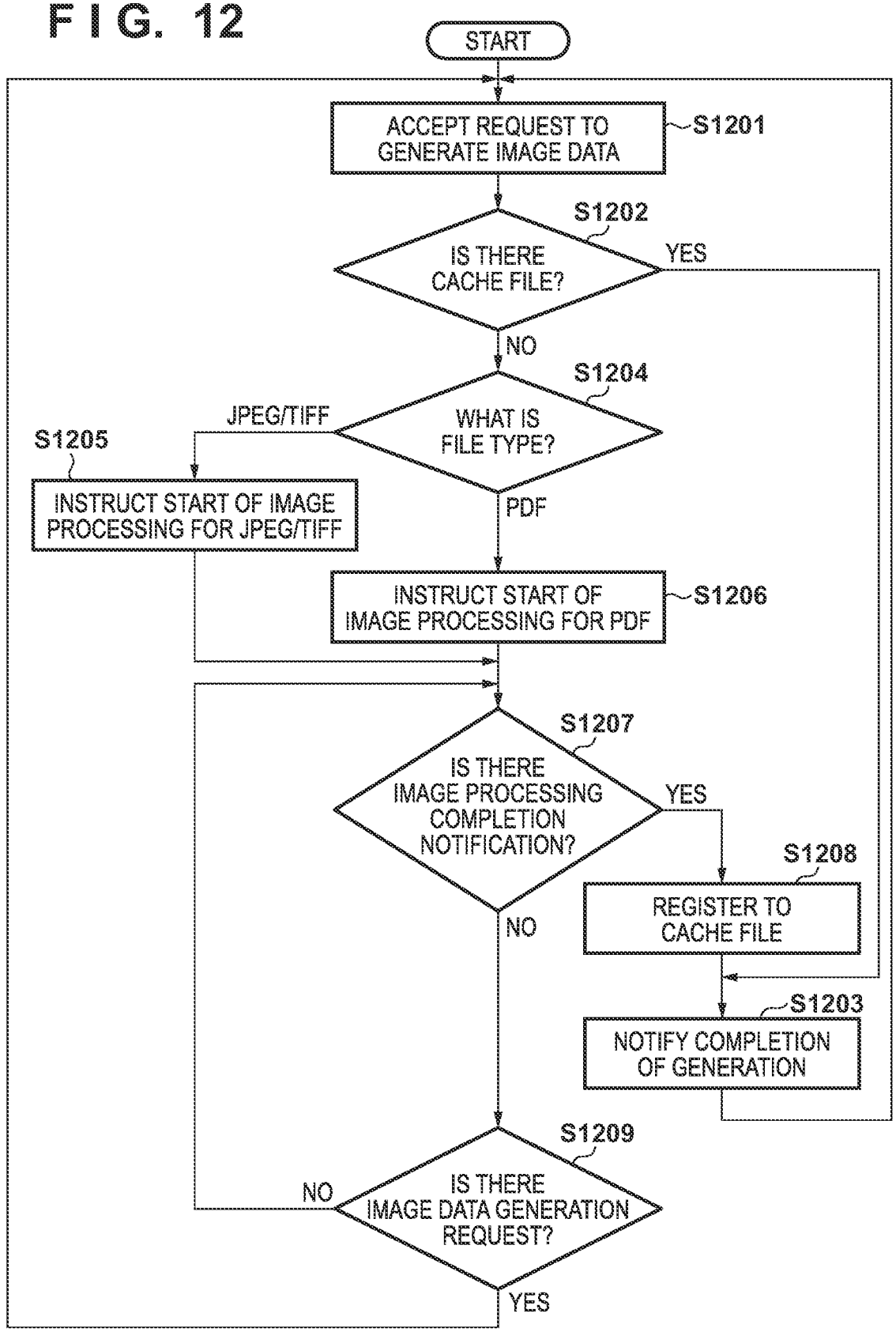
FIG. 12 is a flowchart for describing processing in an image forming apparatus according to a third embodiment.

FIG. 12 is a flowchart for describing processing in the image forming apparatus 100 according to the third embodiment. Note that the processing shown in the flowchart is realized by the CPU 111 executing programs stored in the non-volatile memory 115. Again, the image input control module 305 and the image processing module 309 operate on separate threads, and the image processing module 309 holds, for example, a processing thread for JPEG/TIFF and a processing thread for PDF.

First, in step S1201, the CPU 111 accepts a request for displaying the preview display screen 520 or the thumbnail display screen 700 from the user, and accepts a request for generating image data associated therewith. Next, the processing proceeds to step S1202, and the CPU 111 determines whether or not a cache file of image data, for which a generation request has arrived, is stored in the storage module 308. If the cache file is stored, the processing proceeds to step S1203, and the CPU 111 notifies the storage module 308 of the end of the generation of the image data and the address of the cache file stored therein, and proceeds to step S1201. That is, in step S1203, the CPU 111 notifies the display control module 302 of the end of the generation of the image data and the address of the cache file stored in the storage module 308. This allows the display control module 302 to display an image on the console unit 120 based on the notified address.

On the other hand, if the cache file is not found in step S1202, the processing proceeds to step S1204, and the CPU 111 obtains the extension of the image for which the request for generating image data was accepted, and determines whether or not the file type is JPG/TIFF or PDF. If the file type is a JPEG/TIFF, the processing proceeds to step S1205, and the CPU 111 requests the image processing module 309 for JPEG/TIFF files which operates on another thread to generate image data, and proceeds to step S1207.

On the other hand, if it is determined in step S1204 that the file type is a PDF, the processing proceeds to step S1206, and the CPU 111 requests the image processing module 309 for PDF files which operates on another thread to generate image data, and proceeds to step S1207. As a result, the image input control module 305 can accept a request to generate subsequent image data without waiting for a notification of completion of generation of the image data for which generation has been requested.

In step S1207, when the completion notification of image processing is received, the processing proceeds to step S1208, the CPU 111 registers the corresponding generated image data as a cache file in the storage module 308, and the processing proceeds to step S1203. In step S1203, the CPU 111 makes a notification for the completion of the generation of the image data and the registered address, and proceeds to step S1201. In addition, when there is no notification of completion of the image processing in step S1207, the processing proceeds to step S1209, and when the CPU 111 accepts a request for generation of subsequent image data, the processing proceeds to step S1201, and the CPU 111 accepts the request to generate this image data.

As described above, according to the third embodiment, processing to generate image data for a JPEG/TIFF file, for which image data generation processing takes relatively little time, does not need to wait for processing to generate image data of a PDF file, which takes a longer time.

Figure 18:
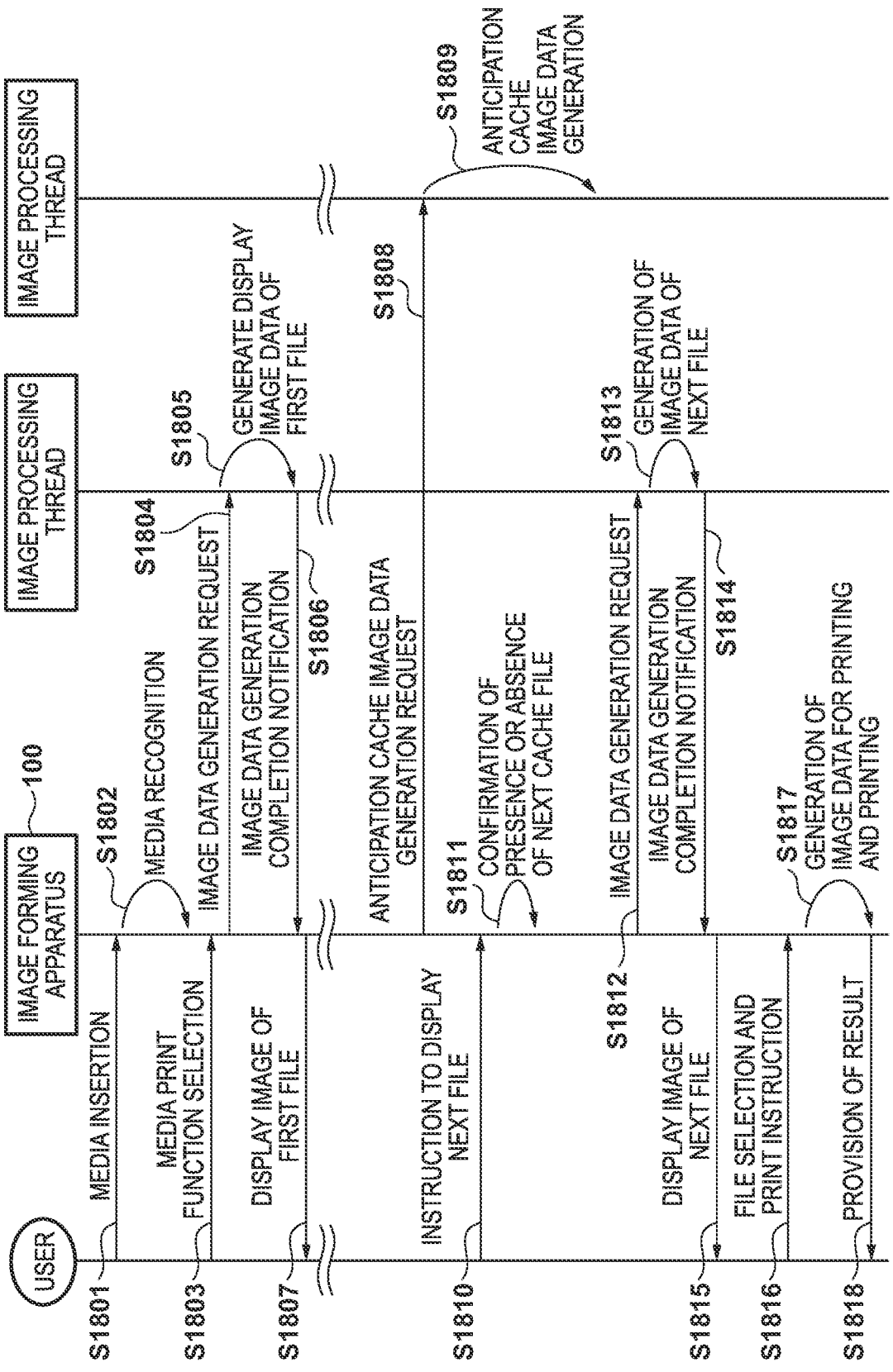
FIG. 18 is a sequence diagram for describing an example of a processing sequence in the third embodiment of the present invention.

FIG. 18 is a sequence diagram for describing an example of a processing sequence in the third embodiment of the present invention.

In step S1801, when the user inserts the USB memory 101 into the image forming apparatus 100, the image forming apparatus 100 in step S1802 recognizes that the USB memory 101 has been inserted. Next, in step S1803, the user presses the media print button 401 on the LUI of the image forming apparatus 100. As a result, in step S1804, the image input control module 305 requests the image processing module 309 (hereinafter, referred to as JPEG/TIFF image processing thread) for JPEG/TIFF that can operate concurrently with other threads to generate the image data of PIC001.jpg. As a result, the JPEG/TIFF image processing thread generates display image data for PIC001.jpg in step S1805 to store in the memory 113, and notifies the image input control module 305 of the completion of the generation of the image data in step S1806. In this way, in step S1807, the image forming apparatus 100 displays the image for PIC001.jpg on the LUI.

After that, in a state where there is no user operation and the generation and registering of cache files for up to PIC002.pdf are completed, the image processing module 309 for PDF (hereinafter referred to as a PDF image processing thread) is requested in step S1808 to generate a cache file for PIC003.pdf, which takes a long time to process. As a result, the PDF image processing thread executes processing to generate image data for the PIC003.pdf in step S1809. Then, during the processing to generate the image data for PIC003.pdf, a request for displaying the next file, PIC004.tiff, is inputted in accordance with a user operation in step S1810. At this time, the image input processing module 305 accepts a display request for PIC004.tiff and determines the presence or absence of a cache file for PIC004.tiff in step S1811. In this case, since the cache file of the PIC004.tiff is not found, the JPEG/TIFF image processing thread is requested to generate the image data of the next file PIC004.tiff in step S1812. As a result, the JPEG/TIFF image processing thread generates display image data for PIC004.tiff to store in the memory 113 in step S1813, and notifies the image input control module 305 of the completion of the generation of the image data in step S1814. In this manner, the image for PIC004.tiff is displayed on the LUI of the image forming apparatus 100 in step S1815. Then, in step S1816, the user confirms the image of the PIC004.tiff, and performs an instruction to select and print the image. As a result, in step S1817, the image forming apparatus 100 generates image data for printing of PIC004.tiff, executes printing, and, in step S1818, provides the printed matter to the user.

As described above, according to the third embodiment, even when a request to display a JPEG/TIFF file without a cache file arrives during the anticipation cache processing for a large PDF file, display is possible without waiting for the generation of the image data of the PDF file.

Fourth Embodiment

In the fourth embodiment, description is given by an example in which processing to generate an anticipation cache is not performed depending on the file type. Note that, since the hardware configuration and the like of the image forming apparatus 100 according to the fourth embodiment are similar to those of the first embodiment described above, descriptions thereof are omitted.

Figure 13:
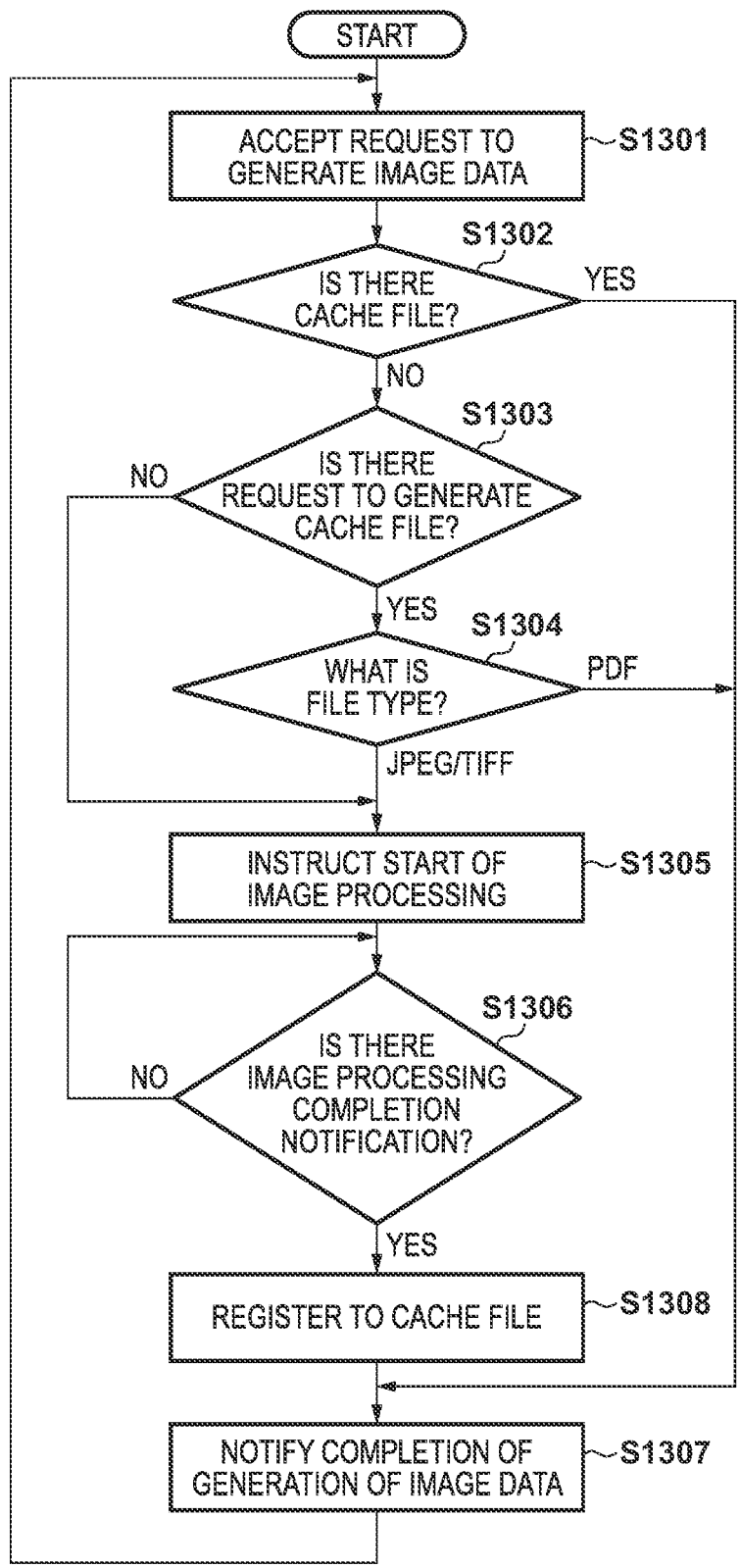
FIG. 13 is a flowchart for describing processing in an image forming apparatus according to a fourth embodiment.

FIG. 13 is a flowchart for describing processing in the image forming apparatus 100 according to the fourth embodiment. Note that the processing shown in the flowchart is realized by the CPU 111 executing programs stored in the non-volatile memory 115. Note that, in FIG. 13, since step S1305 to step S1308 are the same as step S903 to step S906 of FIG. 9 described above, description thereof is omitted.

The CPU 111 accepts a request to generate image data by accepting a request to display the preview display screen 520 or the thumbnail display screen 700 from the user in step S1301. Next, the processing proceeds to step S1302, the CPU 111 determines whether or not a cache file of the image data requested to be generated is stored in the storage module 308, and if the cache file is stored, the processing proceeds to step S1307, and the CPU 111 makes a notification of the end of the generation of the image data and the address of the cache file stored in the storage module 308, and the processing proceeds to step S1301.

In step S1302, when the image data for which the generation request was received is not stored as the cache file, the CPU 111 proceeds to step S1303, and the CPU 111 determines whether the request to generate the image data is in accordance with a display request or in accordance with the generation of an anticipation cache. If it is determined that the file is a request to generate image data for generating the anticipation cache, the processing proceeds to step S1304, and the CPU 111 obtains the extension of the image for which the generation request was received, and determines its file type. If it is determined that the file type is PDF, the processing proceeds to step S1307, and the CPU 111 makes a notification of the completion of the generation of the image data without issuing an instruction to start image processing. At this time, in step S1307, the display control module 302 receives the completion notification, but does not perform any processing because there is no information related to a storage location of the image data.

On the other hand, if it is determined in step S1304 that the file type is JPEG/TIFF, the processing proceeds to step S1305, the CPU 111 sets required parameters, and requests the image processing module 309 for processing to generate image data. In addition, when it is determined in step S1303 that the request is not a request to generate image data in accordance with anticipation cache generation, that is, when it is determined that the request is to generate image data in accordance with a display request, the processing proceeds to step S1305, the CPU 111 sets a required parameter, and requests the image processing module 309 for processing to generate image data.

Figure 19:
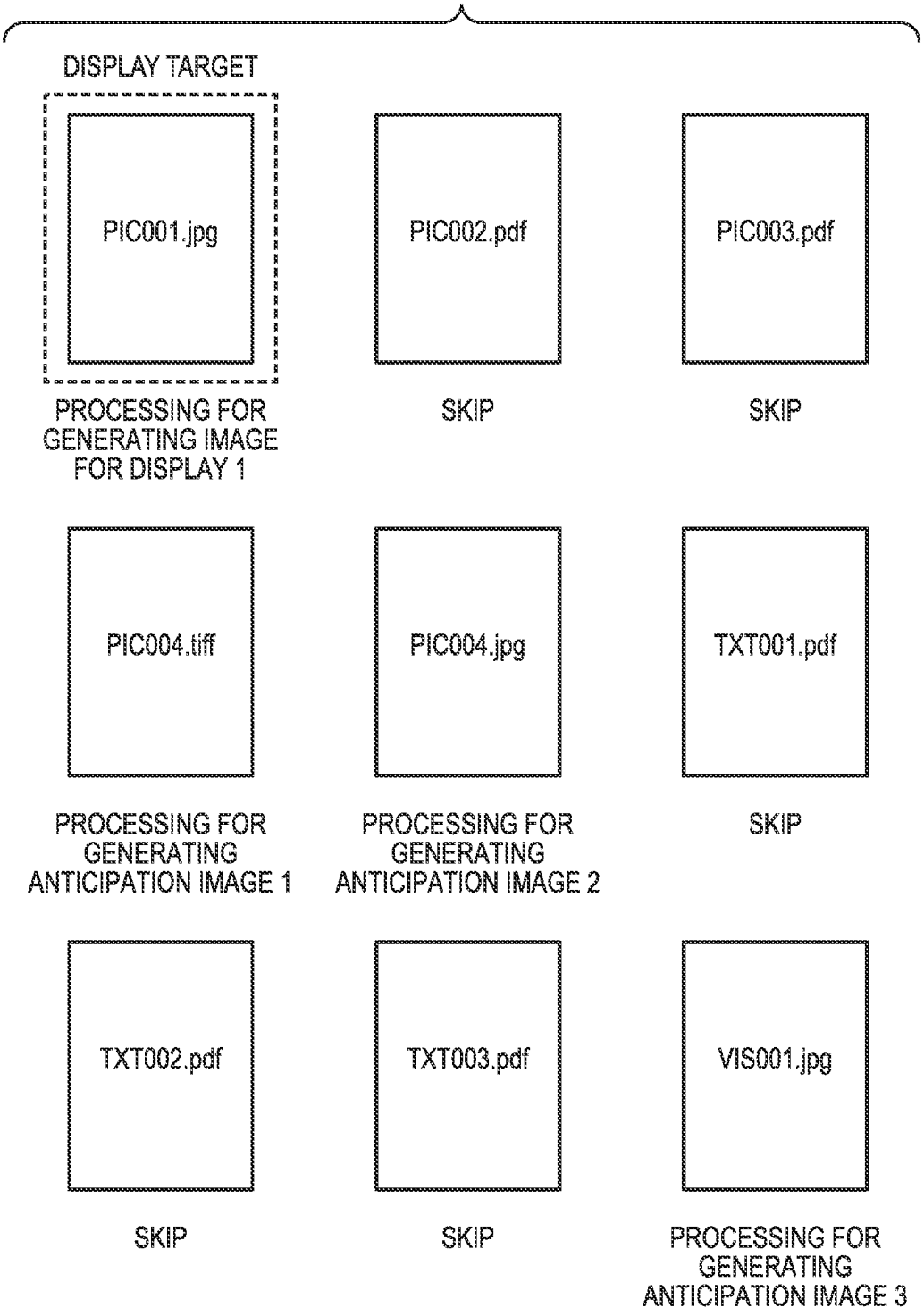
FIG. 19 depicts a view showing an example of targets of anticipation cache generation processing when the fourth embodiment is applied.

FIG. 19 depicts a view showing an example of targets of the anticipation cache generation processing when the fourth embodiment is applied.

Here, by skipping the anticipation cache generation processing for the PDF files PIC002.pdf, PIC003.pdf, TXT001.pdf, and TXT003.pdf, for example, a preview display of an image specified by the user does not need to wait for a PDF file which takes a large amount of time to process.

As described above, according to the fourth embodiment, the generation of the anticipation cache of a PDF file, for which generation of image data takes a relatively long time, is skipped. As a result, processing to generate a cache file for image data does not need to wait for processing to generate image data for a PDF file, which takes a longer time.

Modification of the Second Embodiment

Figure 17:
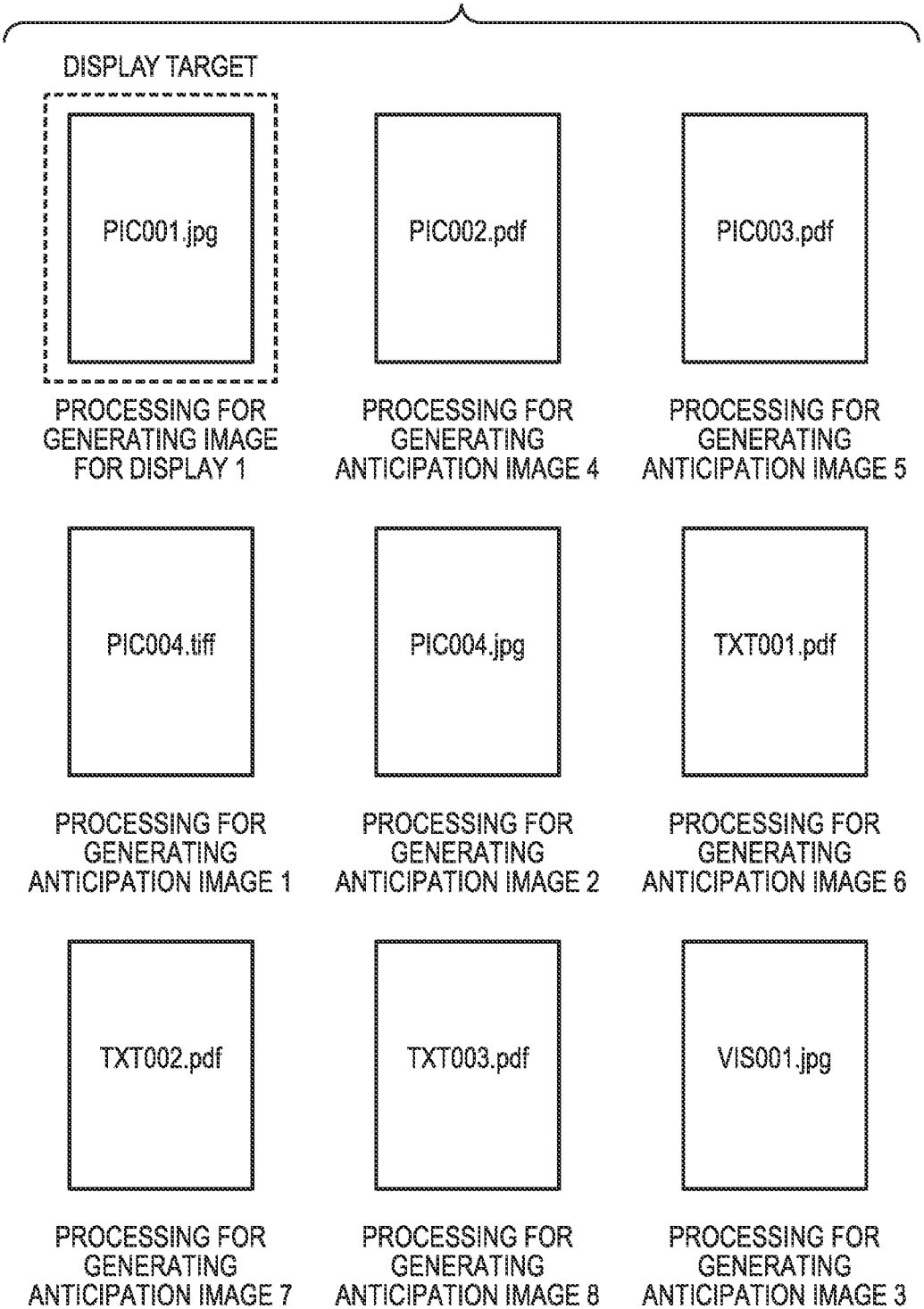
FIG. 17 depicts a view showing an example of a processing order of anticipation cache generation processing when a modification of the second embodiment is applied.

FIG. 17 depicts a view showing an example of a processing order of the anticipation cache generation processing when a modification of the second embodiment is applied.

As described above with reference to FIG. 6, anticipation cache processing is executed in accordance with the order in which the files are arranged (e.g., ascending order or descending order of file name, or edit date/time). Consider now a case where a user displays an image for PIC001.jpg, anticipation cache processing is subsequently started, and then the user attempts to display an image for PIC004.tiff. At this time, if PIC002.pdf which is a target of the anticipation cache processing is a very large file, an image display for the PIC004.tiff is made to wait until the processing for generating the image data for the PIC002.pdf completes. Therefore, in this modification, the anticipation cache generation processing is performed in the order shown in FIG. 17. In the example of FIG. 17, after the user displays the image for PIC001.jpg, the anticipation cache processing is started. At this time, the order of images for which an anticipation cache is made is PIC004.tiff, then PIC004.jpg, and then VIS001.jpg, for which relatively short amounts of time are required for processing. Thereafter, cache processing is executed for PDF files (PIC003.pdf, TXT001.pdf and the like), which require a relatively longer amount of time to process.

Therefore, according to this modification, after displaying the image of PIC001.jpg, the anticipation cache processing is executed in order from PIC004.tiff, PIC004.JPG, and VIS001.jpg, which take relatively little time to process. For this reason, after the first image is displayed, it is possible to promptly accept a request to display a subsequent image and process the request.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-139624, filed Jul. 25, 2018, which is hereby incorporated by reference herein in its entirety.

What is claimed is:

1. An image processing apparatus capable of displaying previews of a plurality of files stored in a storage, comprising:
    a display that is operable to display a preview;
    a memory device that stores instructions; and
    one or more controllers that execute the instructions stored in the memory device to cause the image processing apparatus to function as:
        a unit that, in a state in which a screen including a preview of a first file but not including previews of a second file and a third file is displayed on the display, generates cache data for displaying a preview of the second file, without a user instruction, based on that the second file is a first type, and does not generate cache data for displaying a preview of the third file based on that the third file is a second type,
    wherein the cache data for displaying the preview of the second file is read out to display the preview of the second file on the display upon an instruction for designating the second file as a target of the preview in a state in which the cache data for displaying the preview of the second file is held,
    wherein cache data for displaying of a preview of the third file is generated to display the preview of the third file on the display upon an instruction for designating the third file as a target of the preview, and
    wherein the file of the first type includes a JPG file or a TIFF file, and a file of the second type includes a PDF file.

2. The image processing apparatus according to claim 1, wherein the unit generates cache data for displaying a preview in an order starting with a file of the first type that can be processed in a shorter amount of time.

3. The image processing apparatus according to claim 1, wherein the one or more controllers execute the instructions to further cause the image processing apparatus to function as a caching unit configured to cache the generated cache data.

4. The image processing apparatus according to claim 1, wherein the storage is a removable medium that is able to be mounted to the image processing apparatus.

5. The image processing apparatus according to claim 4, wherein the removable medium is a USB flash drive.

6. A method of controlling an image processing apparatus capable of displaying previews of a plurality of files stored in a storage, the method comprising:
    generating, in a state in which a screen including a preview of a first file but not including previews of a second file and a third file is displayed on a display, cache data for displaying a preview of the second file, without a user instruction, based on that the second file is a first type, and not generating cache data for displaying a preview of the third file based on that the third file is a second type,
    reading out the cache data for displaying the preview of the second file to display the preview of the second file on the display upon an instruction for designating the second file as a target of the preview in a state in which the cache data for displaying the preview of the second file is held; and
    generating cache data for displaying of a preview of the third file to display the preview of the third file on the display upon an instruction for designating the third file as a target of the preview,
    wherein the file of the first type includes a JPG file or a TIFF file, and a file of the second type includes a PDF file.

7. A non-transitory computer-readable storage medium storing a program for causing a processor to execute a method of controlling an image processing apparatus capable of displaying previews of a plurality of files stored in a storage, the method comprising:
    generating, in a state in which a screen including a preview of a first file but not including previews of a second file and a third file is displayed on a display, cache data for displaying a preview of the second file, without a user instruction, based on that the second file is a first type, and not generating cache data for displaying a preview of the third file based on that the third file is a second type,
    reading out the cache data for displaying the preview of the second file to display the preview of the second file on the display upon an instruction for designating the second file as a target of the preview in a state in which the cache data for displaying the preview of the second file is held; and
    generating cache data for displaying of a preview of the third file to display the preview of the third file on the display upon an instruction for designating the third file as a target of the preview,
    wherein the file of the first type includes a JPG file or a TIFF file and a file of the second type includes a PDF file.

8. The image processing apparatus according to claim 1, wherein the screen includes an object for making a transition to a screen that displays a preview of a next file of the first file.

9. The image processing apparatus according to claim 1, wherein the screen includes an object for making a transition to a screen that displays a preview of a previous file of the first file.

10. The image processing apparatus according to claim 1, wherein the screen includes a name of a file that is displayed as the preview.

11. The image processing apparatus according to claim 1, wherein the screen includes directory information of a file that is displayed as the preview.

12. The image processing apparatus according to claim 1, wherein the screen includes an object for making a transition to a setting screen.

13. The image processing apparatus according to claim 1, wherein the screen is a screen for browsing a preview of a single file.

14. The image processing apparatus according to claim 1, wherein the screen is a screen for browsing a plurality of thumbnail images.

15. The image processing apparatus according to claim 1, further comprising an image forming device that forms an image on a sheet,
    wherein the one or more controllers execute the instructions to further cause the image forming device to form an image based on a file.

16. The image processing apparatus according to claim 1, wherein the screen is a screen for a media print function.

17. The image processing apparatus according to claim 16, wherein the media print function is one of a plurality of functions of the image processing apparatus.

18. The image processing apparatus according to claim 17, wherein the plurality of functions include at least one of a copy function, a facsimile function, a scanning function and a secure print function other than the media print function.

* * * * *